(12) United States Patent
Miyazaki

(10) Patent No.: US 9,281,679 B2
(45) Date of Patent: Mar. 8, 2016

(54) ELECTRONIC DEVICE

(71) Applicant: FUJITSU LIMITED, Kawasaki-shi, Kanagawa (JP)

(72) Inventor: Takahiro Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 438 days.

(21) Appl. No.: 13/896,809

(22) Filed: May 17, 2013

(65) Prior Publication Data

US 2013/0250468 A1    Sep. 26, 2013

Related U.S. Application Data

(63) Continuation of application No. PCT/JP2010/072002, filed on Dec. 8, 2010.

(51) Int. Cl.
    *H02H 9/08*    (2006.01)
    *H02H 9/02*    (2006.01)
    *H02H 9/00*    (2006.01)

(52) U.S. Cl.
    CPC *H02H 9/02* (2013.01); *H02H 9/004* (2013.01)

(58) Field of Classification Search
    CPC .............................. H02H 9/02; H02H 9/004
    See application file for complete search history.

(56) References Cited

U.S. PATENT DOCUMENTS

2006/0012929 A1* 1/2006 Chen et al. ................... 361/91.1

FOREIGN PATENT DOCUMENTS

| JP | 59-61429 | 4/1984 |
|---|---|---|
| JP | 1-142907 | 6/1989 |
| JP | 3-70086 | 7/1991 |
| JP | 5-219756 | 8/1993 |
| JP | 6-311671 | 11/1994 |
| JP | 7-143736 | 6/1995 |
| JP | 11-327708 | 11/1999 |

OTHER PUBLICATIONS

Patent Abstracts of Japan, Publication No. 11-327708, Published Nov. 30, 1999.
Patent Abstracts of Japan, Publication No. 07-143736, Published Jun. 2, 1995.
Patent Abstracts of Japan, Publication No. 06-311671, Published Nov. 4, 1994.

(Continued)

*Primary Examiner* — Thienvu Tran
*Assistant Examiner* — Tien Mai
(74) *Attorney, Agent, or Firm* — Staas & Halsey LLP

(57) ABSTRACT

A load circuit operates by power supplied from a power supply apparatus. A capacitive element is connected in parallel with the load circuit. A switching element is connected between the power supply apparatus and the load circuit in series with the power supply apparatus and the load circuit. A monitor section monitors voltage of the capacitive element and is connected in parallel with the capacitive element. An inrush current control section changes resistance of the switching element on the basis of the voltage monitored by the monitor section in order to control inrush current that flows at the time of an electronic device being plugged into or unplugged from the power supply apparatus. A breaker circuit prevents electric charges stored by the capacitive element from flowing into the monitor section at the time of the electronic device being unplugged from the power supply apparatus.

5 Claims, 14 Drawing Sheets

(56) References Cited

OTHER PUBLICATIONS

Patent Abstracts of Japan, Publication No. 01-142907, Published Jun. 5, 1989.

Patent Abstracts of Japan, Publication No. 05-219756, Published Aug. 27, 1993.

International Search Report mailed Mar. 15, 2011 in corresponding International Application No. PCT/JP2010/072002.

\* cited by examiner

ELECTRONIC DEVICE

CROSS-REFERENCE TO RELATED APPLICATION

This application is a continuation application of International Application PCT/JP2010/072002 filed on Dec. 8, 2010 which designated the U.S., the entire contents of which are incorporated herein by reference.

FIELD

The embodiments discussed herein are related to an electronic device.

BACKGROUND

In order to meet the convenience of users or improve reliability, it is desirable that while apparatus are in operation, maintenance or replacement can be performed. Accordingly, electronic devices which can be plugged or unplugged with power turned on (hot swap) have traditionally been used widely. When such an electronic device is newly plugged with power turned on, no electric charge is stored by an input capacitor which stabilizes an electric current in a circuit, and charging current flows to the input capacitor. This charging current is referred to as inrush current and is excessive surge current. This surge current causes a protective fuse to blow, causes a connector to melt and adhere, or causes a momentary drop in supplied voltage. This leads to damage to an electronic device or a temporary stoppage of the operation. In order to prevent this inrush current, an inrush current control circuit, for example, is used. Usually a method utilizing control of the ON-state resistance of an FET (Field Effect Transistor) is adopted.

Furthermore, generally two or more power supplies are used. Even if a failure occurs in one power supply, an apparatus can be operated continuously. These two or more power supplies are integrated into one system by the use of back flow preventing diodes and power is supplied to a circuit.

The following power supply apparatus is proposed. A diode is connected in a forward direction to direct-current input and an input voltage detection circuit is placed between the diode and the direct-current input. A loss of a switching element at a low input voltage needs to be controlled. When input voltage is detected, base current in a drive circuit of the switching element is increased, collector current in the drive circuit is increased, and a resonance current for a tank circuit is supplied stably. By doing so, spike noise is controlled and the loss is controlled (see, for example, Japanese Laid-open Patent Publication No. 05-219756).

There are cases where power is applied and disconnected repeatedly in a short period of time. In a hot swap of a circuit board, for example, connector chattering occurs or unplugging and plugging are repeated in a short period of time. As a result, excessive inrush current may flow in a circuit. Furthermore, if a connector is electrically connected and disconnected many times successively, power is repeatedly applied and disconnected many times in a short period of time. As a result, excessive inrush current flows many times in a circuit because of electric charges stored by a capacitor. This excessive inrush current causes a fuse to blow, causes a connector to melt and adhere, or causes a drop in power supply voltage. This leads to damage to a circuit board or a temporary stoppage of the operation.

SUMMARY

According to an aspect, there is provided an electronic device plugged into or unplugged from a first power supply apparatus. This electronic device includes a load circuit which operates by power supplied from the first power supply apparatus, a capacitive element connected in parallel with the load circuit, a switching element connected between the first power supply apparatus and the load circuit in series with the first power supply apparatus and the load circuit, a monitor section which monitors voltage of the capacitive element and which is connected in parallel with the capacitive element, an inrush current control section which changes resistance of the switching element on the basis of the voltage monitored by the monitor section in order to control inrush current that flows at the time of the electronic device being plugged into or unplugged from the first power supply apparatus, and a breaker circuit which prevents electric charges stored by the capacitive element from flowing into the monitor section at the time of the electronic device being unplugged from the first power supply apparatus.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
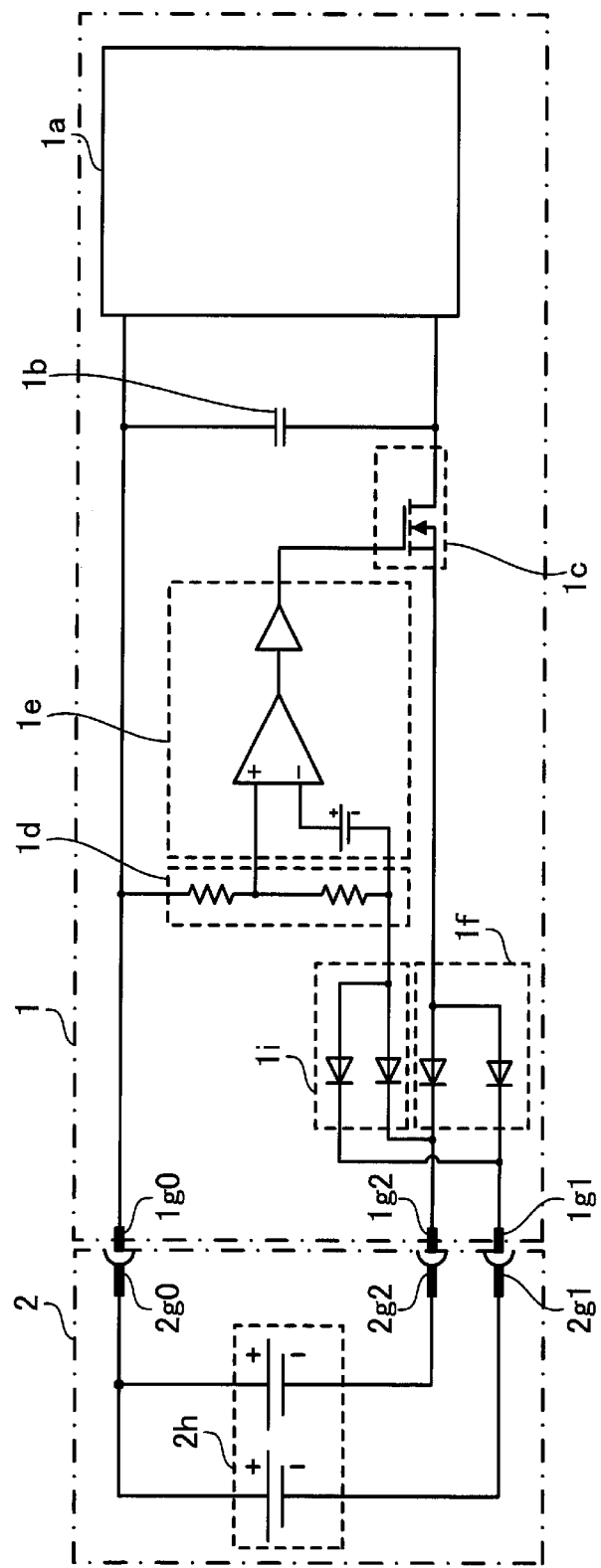
FIG. 1 is a view for describing an electronic device according to a first embodiment.

Embodiments will now be described in detail with reference to the accompanying drawings, wherein like reference numerals refer to like elements throughout.

(First Embodiment)

FIG. 1 is a view for describing an electronic device according to a first embodiment. As illustrated in FIG. 1, an electronic device 1 includes a load circuit 1a, a capacitive element 1b, a switching element 1c, a monitor section 1d, an inrush current control section 1e, a breaker circuit 1f, terminals 1g0, 1g1, and 1g2, and a back flow preventing circuit 1i. In addition, a hot swap can be performed between the electronic device 1 and a power supply apparatus 2. The power supply apparatus 2 includes terminals 2g0, 2g1, and 2g2 and a power supply section 2h.

The load circuit 1a operates by power supplied from the power supply apparatus 2. The load circuit 1a realizes the function of the electronic device 1 by the use of power supplied from the power supply apparatus 2.

The capacitive element 1b is connected in parallel with the load circuit 1a. The capacitive element 1b is, for example, a capacitor and stabilizes power supplied to the load circuit 1a by storing power supplied from the power supply apparatus 2.

The switching element 1c is connected between the power supply apparatus 2 and the load circuit 1a in series with them. The switching element 1c controls an electric current which flows in a circuit in the electronic device 1.

The monitor section 1d is connected to the terminal 1g0 on a plus side of voltage supplied to the electronic device 1. The monitor section 1d monitors voltage supplied to the electronic device 1, and outputs the voltage, which is a monitoring result, to the inrush current control section 1e. Furthermore, the monitor section 1d is connected in parallel with the capacitive element 1b.

The inrush current control section 1e changes the resistance of the switching element 1c on the basis of voltage monitored by the monitor section 1d, and controls inrush current which flows at plugging time after unplugging in a state in which a hot swap can be performed between the electronic device 1 and the power supply apparatus 2. For example, the inrush current control section 1e sets the resistance of the switching element 1c to a high value at the time of unplugging the electronic device 1 from the power supply apparatus 2. This makes it possible to control inrush current which flows at the time of plugging the electronic device 1 into the power supply apparatus 2 after unplugging. In addition, for example, the inrush current control section 1e gradually decreases the resistance of the switching element 1c at the time of plugging the electronic device 1 into the power supply apparatus 2. This makes it possible to control inrush current which flows at the time of plugging the electronic device 1 into the power supply apparatus 2.

When the electronic device 1 is unplugged from the power supply apparatus 2, the breaker circuit 1f prevents electric charges stored by the capacitive element 1b from flowing into the monitor section 1d. As a result, voltage monitored by the monitor section 1d drops. The inrush current control section 1e changes the resistance of the switching element 1c on the basis of a drop in the voltage monitored by the monitor section 1d. This controls inrush current which flows at plugging time after unplugging in a state in which a hot swap can be performed between the electronic device 1 and the power supply apparatus 2. Furthermore, if the power supply section 2h includes two power supplies, the breaker circuit 1f prevents return current between the power supplies.

The terminals 1g0, 1g1, and 1g2 can be connected electrically to the terminals 2g0, 2g1, and 2g2 respectively. Power is supplied from the power supply apparatus 2 to the electronic device 1 via the terminals 1g0 through 1g2 and 2g0 through 2g2. In the first embodiment the three pairs of terminals, that is to say, the pair of terminals 1g0 and 2g0, the pair of terminals 1g1 and 2g1, and the pair of terminals 1g2 and 2g2 are used. However, the number of terminals included in the electronic device 1 and the power supply apparatus 2 is not limited to 3. The electronic device 1 and the power supply apparatus 2 may include two or four or more terminals, that is to say, any number of terminals according to the number of power supplies included in the power supply section 2h.

If the power supply section 2h includes two power supplies, the back flow preventing circuit 1i prevents return current between the power supplies.

The power supply section 2h includes one or more (two, for example) power supplies which supply direct-current power used by the electronic device 1. If the power supply section 2h includes a plurality of power supplies, these power supplies may be connected in parallel to increase the reliability of the power supply section 2h.

As has been described, when the electronic device 1 is unplugged from the power supply apparatus 2, the electronic device 1 can use the breaker circuit 1f for preventing electric charges stored by the capacitive element 1b from flowing into the monitor section 1d. In addition, the electronic device 1 can change the resistance of the switching element 1c on the basis of voltage monitored by the monitor section 1d, and control inrush current which flows at plugging time after unplugging in a state in which a hot swap can be performed between the electronic device 1 and the power supply apparatus 2.

(Second Embodiment)

A second embodiment will now be described in detail with reference to the accompanying drawings.

Figure 2:
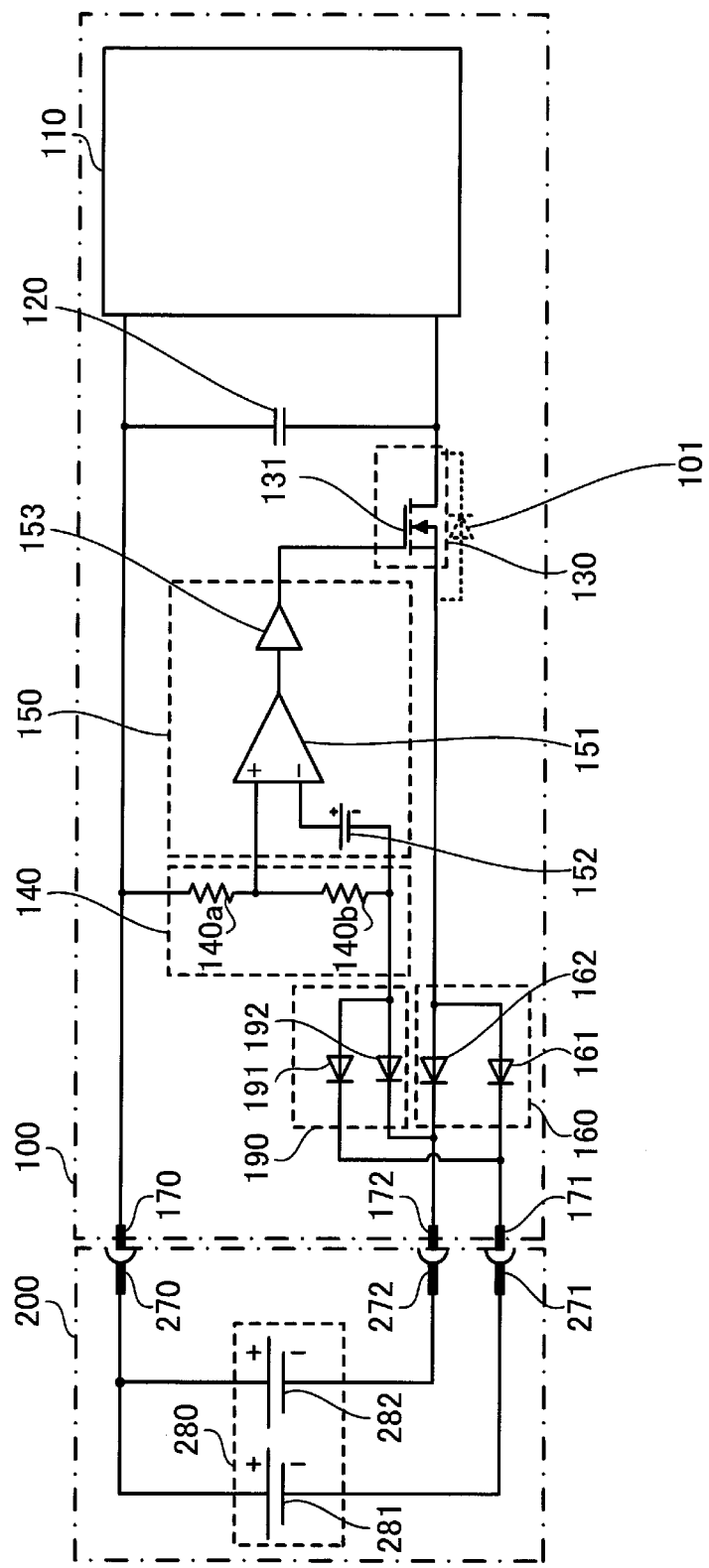
FIG. 2 is a view for describing an electronic device according to a second embodiment.

FIG. 2 is a view for describing an electronic device according to a second embodiment. As illustrated in FIG. 2, an electronic device 100 includes a load circuit 110, a capacitive element 120, a switching element 130, a monitor section 140, an inrush current control section 150, a breaker circuit 160, terminals 170, 171, and 172, and a back flow preventing circuit 190. A hot swap can be performed between the electronic device 100 and a power supply apparatus 200. The electronic device 100 is, for example, a communication device. In order to perform maintenance or replacement during the operation of the electronic device 100, it is desirable that a hot swap can be performed between the electronic device 100 and the power supply apparatus 200. The electronic device 100 is connected to the power supply apparatus 200, operates by the use of power supplied from the power supply apparatus 200, and performs a determined communication process. The electronic device 100 may not be a communication device. That is to say, the electronic device 100 is a device which operates by the use of supplied power, for which a hot swap can be performed, and which has any function.

The power supply apparatus 200 includes terminals 270, 271, and 272 and a power supply section 280. The electronic device 100 and the power supply apparatus 200 can be connected electrically via the terminals 170 through 172 included in the electronic device 100 and the terminals 270 through 272 included in the power supply apparatus 200.

Furthermore, the monitor section 140 includes voltage division resistors 140a and 140b. The inrush current control section 150 includes a comparator 151, a reference power supply 152, and an FET gate control circuit 153. The breaker circuit 160 includes diodes 161 and 162. The back flow preventing circuit 190 includes diodes 191 and 192. The power supply section 280 includes power supplies 281 and 282 which are direct-current power supplies.

The load circuit 110 operates by power supplied from the power supply apparatus 200. The load circuit 110 realizes the function of the electronic device 100 by the use of power supplied from the power supply apparatus 200.

The capacitive element 120 is connected in parallel with the load circuit 110. The capacitive element 120 is an input capacitor which stabilizes power supplied to the load circuit 110. The capacitive element 120 stabilizes power supplied to the load circuit 110 by storing electric charges supplied from the power supply apparatus 200.

The switching element 130 is connected between the power supply apparatus 200 and the load circuit 110 in series with them. The switching element 130 controls an electric current which flows in a circuit in the electronic device 100. The switching element 130 is, for example, an FET and controls inrush current in the electronic device 100.

A diode 101 indicates a parasitic diode of an FET gate 131. The diode 101 causes an electric current to flow in a reverse direction in a circuit in the electronic device 100.

The monitor section 140 is connected to the terminal 170 on a plus side of voltage supplied to the electronic device 100. The monitor section 140 monitors voltage supplied to the electronic device 100, and outputs voltage, which is a monitoring result, to the inrush current control section 150. Furthermore, the monitor section 140 is connected in parallel with the capacitive element 120. The monitor section 140 monitors voltage on a cathode side of the diode 161 or 162 and input voltage supplied from the power supply apparatus 200, and outputs the logical sum of results obtained by the voltage monitoring.

The voltage division resistors 140a and 140b monitor input voltage. The voltage division resistors 140a and 140b are set so that when the power supply apparatus 200 supplies normal voltage to the electronic device 100, the potential difference between both ends of the voltage division resistor 140b will be greater than or equal to reference voltage supplied from the reference power supply 152.

The inrush current control section 150 controls the switching element 130 on the basis of voltage detected by the monitor section 140. The inrush current control section 150 changes the resistance of the switching element 130 on the basis of voltage monitored by the monitor section 140, and controls inrush current which flows at the time of performing a hot swap between the electronic device 100 and the power supply apparatus 200. When voltage monitored by the monitor section 140 is zero, the inrush current control section 150 controls the switching element 130 so as to make its resistance infinite. When the electronic device 100 is unplugged from the power supply apparatus 200, the inrush current control section 150 sets the resistance of the switching element 130 to a high value. This makes it possible to control inrush current which flows at the time of plugging the electronic device 100 into the power supply apparatus 200 after the unplugging. In addition, when the electronic device 100 is plugged into the power supply apparatus 200, the inrush current control section 150 gradually decreases the resistance of the switching element 130. This makes it possible to control inrush current which flows at the time of plugging the electronic device 100 into the power supply apparatus 200.

The comparator 151 compares reference voltage supplied from the reference power supply 152 with voltage generated between both ends of the voltage division resistor 140b of the monitor section 140.

The reference power supply 152 supplies to the comparator 151 voltage used as reference for comparison. The FET gate control circuit 153 controls the switching element 130, which is an FET, and controls inrush current by gradually decreasing the resistance of the switching element 130.

It is assumed that the electronic device 100 is unplugged from the power supply apparatus 200 and that input voltage supplied from the power supply apparatus 200 drops. Then discharge current which flows from the capacitive element 120 is interrupted by the breaker circuit 160, an electric current does not flow through the monitor section 140, and voltage generated between both ends of the voltage division resistor 140b, that is to say, monitored voltage is 0 V. The comparator 151 makes a comparison. When there is no potential difference between potential on the cathode side of the diode 161 or 162 and potential on a plus side of the power supplies of the power supply apparatus 200, the inrush current control section 150 exercises control so as to change the switching element 130 from an ON state to an OFF state. This prevents charging current from flowing to the capacitive element 120 at the time of the electronic device 100 being plugged into the power supply apparatus 200 later.

Furthermore, it is assumed that the electronic device 100 is plugged into the power supply apparatus 200 after unplugging. Then an electric current based on input voltage supplied from the power supply apparatus 200 flows in a circuit in the electronic device 100. As a result, voltage generated between both ends of the voltage division resistor 140b, that is to say, monitored voltage increases. The comparator 151 makes a comparison. When the potential difference between potential on the cathode side of the diode 161 or 162 and potential on the plus side of the power supplies of the power supply apparatus 200 is greater than or equal to reference voltage supplied from the reference power supply 152, the inrush current control section 150 exercises control so as to gradually decrease the resistance of the switching element 130 in an OFF state and put the switching element 130 into an ON state. This prevents an increase in charging current which flows to the capacitive element 120 after the plugging of the electronic device 100 into the power supply apparatus 200.

The breaker circuit 160 is placed between the switching element 130 and the monitor section 140. When the electronic device 100 is unplugged from the power supply apparatus 200, the breaker circuit 160 prevents electric charges stored by the capacitive element 120 from flowing into the monitor section 140.

The diodes 161 and 162 are back flow preventing diodes. That is to say, the diodes 161 and 162 are used for integrating the two power supplies into one in a circuit, interrupting return current between the two power supplies 281 and 282 included in the power supply section 280, and preventing an electric current which flows from the power supply section 280 from flowing backward. The diodes 161 and 162 are connected so that an electric current from the power supply apparatus 200 will flow in a forward direction. Furthermore, when the electronic device 100 is unplugged from the power supply apparatus 200, the diodes 161 and 162 prevent discharge current based on electric charges stored by the capacitive element 120 from flowing into the monitor section 140. The diodes 161 and 162 are taken as an example of a breaker circuit.

The terminals 170, 171, and 172 can be connected electrically to the terminals 270, 271, and 272 respectively. Power is supplied from the power supply apparatus 200 to the electronic device 100 via the terminals 170 through 172 and 270 through 272.

The back flow preventing circuit 190 is connected in series with the monitor section 140. The back flow preventing circuit 190 interrupts return current between the two power supplies 281 and 282 included in the power supply section 280.

Cathode-side terminals of the diodes 191 and 192 are connected to cathode-side terminals of the diodes 161 and 162 respectively. The diodes 191 and 192 interrupt return current between the two power supplies 281 and 282 included in the power supply section 280.

The power supply section 280 includes the power supplies 281 and 282 which supply direct-current power used by the electronic device 100. The power supply section 280 supplies power to the electronic device 100 by the use of the power supplies 281 and 282 connected in parallel. The power supply section 280 includes the two power supplies 281 and 282, so the reliability of the power supply section 280 is increased.

As stated above, when the electronic device 100 is unplugged from the power supply apparatus 200, discharge current from the capacitive element 120 is interrupted by the breaker circuit 160 and voltage generated between both ends of the voltage division resistor 140b, that is to say, monitored voltage becomes 0 V. The comparator 151 detects that the monitored voltage is lower than or equal to reference voltage supplied from the reference power supply 152. As a result, the inrush current control section 150 exercises control so as to change the switching element 130 from an ON state to an OFF state.

When the electronic device 100 is plugged into the power supply apparatus 200 after the unplugging, an electric current supplied from the power supply section 280 flows through the monitor section 140 and voltage generated between both ends of the voltage division resistor 140b, that is to say, monitored voltage becomes higher than or equal to the reference voltage. The comparator 151 detects that the monitored voltage is higher than or equal to the reference voltage supplied from the reference power supply 152. As a result, the inrush current control section 150 exercises control so as to gradually decrease the resistance of the switching element 130 in an OFF state and put the switching element 130 into an ON state. By doing so, charging current to the capacitive element 120 is controlled and an electric current flows in the electronic device 100.

As has been described, by controlling charging current to the capacitive element 120, a rapid increase in electric current can be controlled in a circuit in the electronic device 100 at the time of the electronic device 100 being plugged into the power supply apparatus 200. Accordingly, inrush current which flows at plugging time after unplugging in a state in which a hot swap can be performed between the electronic device 100 and the power supply apparatus 200 can be controlled.

Figure 3:
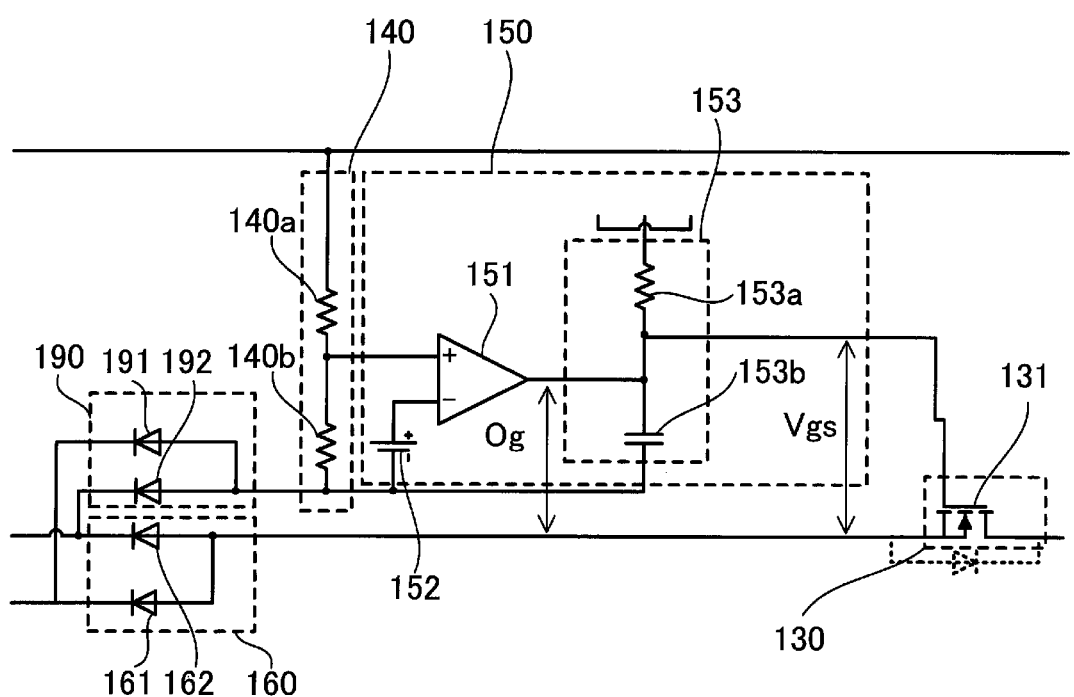
FIG. 3 is a view for describing an example of an FET gate control circuit.

FIG. 3 is a view for describing an example of an FET gate control circuit. As illustrated in FIG. 3, an electronic device 100 includes a switching element 130, a monitor section 140, an inrush current control section 150, a breaker circuit 160, and a back flow preventing circuit 190. The switching element 130 includes an FET gate 131. The monitor section 140 includes voltage division resistors 140a and 140b. The inrush current control section 150 includes a comparator 151, a reference power supply 152, and an FET gate control circuit 153. The breaker circuit 160 includes diodes 161 and 162. The back flow preventing circuit 190 includes diodes 191 and 192.

The FET gate control circuit 153 is an RC timer circuit including a resistor 153a and a capacitor 153b. When output from the comparator 151 changes from Low to High, an electric current flows to the resistor 153a and the capacitor 153b included in the FET gate control circuit 15, and the capacitor 153b is gradually charged. As a result, as described later in FIG. 6, gate voltage of the FET gate 131 gradually increases. When gate voltage of the FET gate 131 is low, drain current, that is to say, an electric current inputted from the power supply apparatus 200 to a circuit in the electronic device 100 (described later in FIG. 5) is limited. When the gate voltage increases, it is possible to pass more drain current. By setting a period in which the gate voltage is low and limiting input current for this period, the capacitor 153b is gradually charged.

Furthermore, when output from the comparator 151 changes from High to Low, the capacitor 153b of the FET gate control circuit 153 is short-circuited, gate voltage of the FET gate 131 drops to 0 V, and the FET gate 131 goes into an OFF state.

The resistor 153a of the FET gate control circuit 153 may be replaced with a constant-current circuit. In this case, the capacitor 153b is gradually charged by gradually increasing gate voltage of the FET gate 131.

The state of a circuit at the time of unplugging and plugging the electronic device 100 will now be described with reference to FIGS. 4 and 5.

Figure 4:
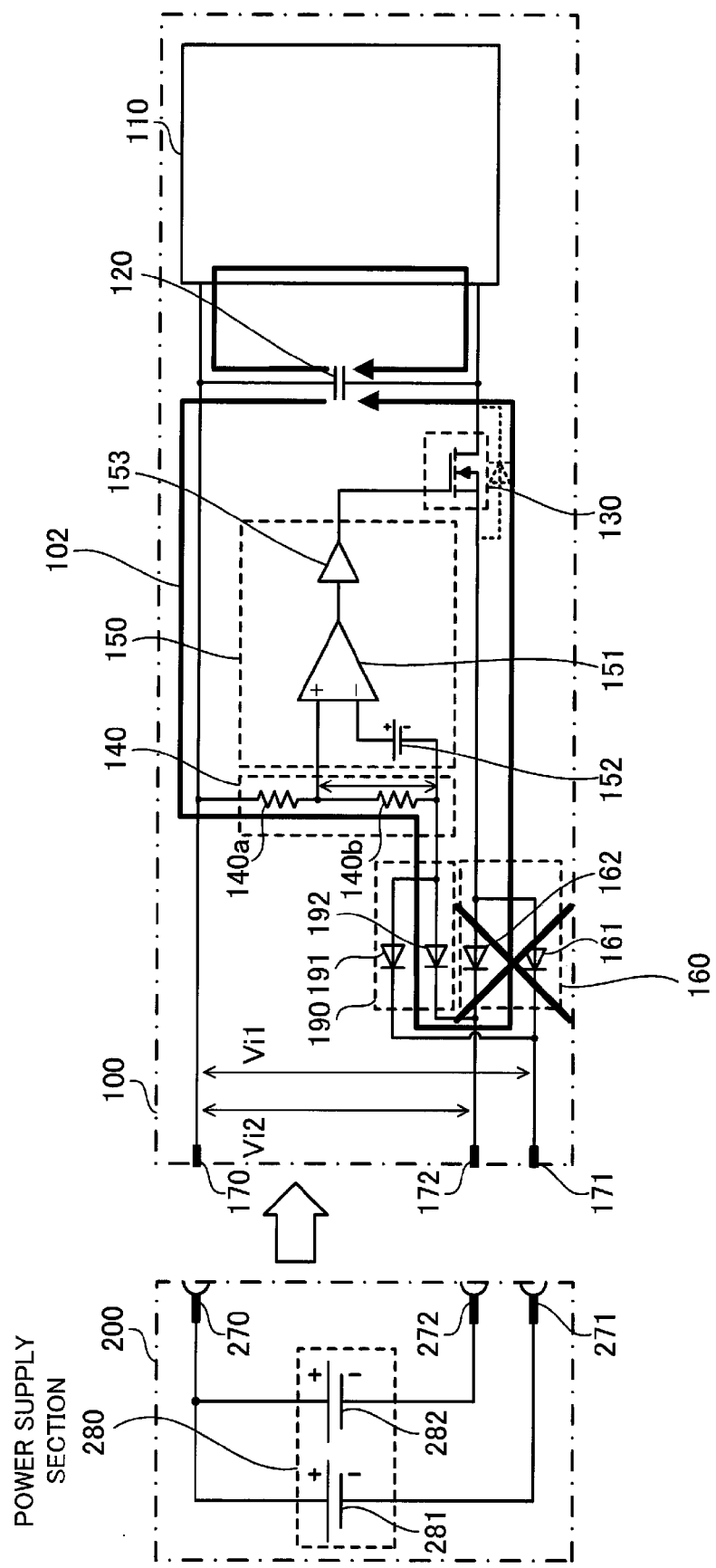
FIG. 4 is a view for describing the state of a circuit at the time of unplugging the electronic device.
Figure 5:
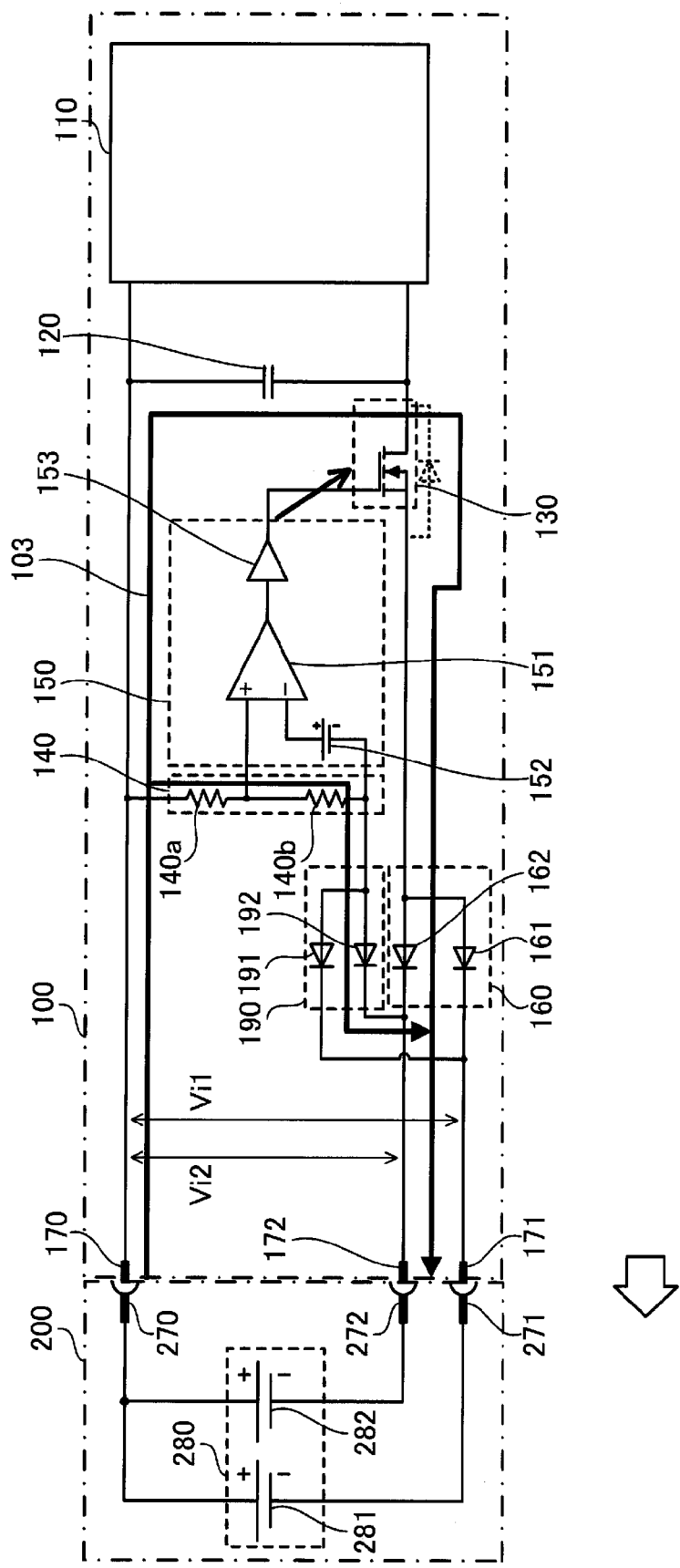
FIG. 5 is a view for describing the state of a circuit at the time of plugging the electronic device.

FIG. 4 is a view for describing the state of a circuit at the time of unplugging the electronic device. FIG. 5 is a view for describing the state of a circuit at the time of plugging the electronic device.

First the state of a circuit in the electronic device 100 at the time of unplugging the electronic device 100 from the power supply apparatus 200 will be described with reference to FIG. 4.

When the electronic device 100 is unplugged from the power supply apparatus 200 to which it is connected via the terminals 170 through 172 and 270 through 272, voltage Vi1 and voltage Vi2 at a receiving end of the electronic device 100 drop. As a result, voltage generated between both ends of the capacitive element 120 gradually drops with a discharge of the capacitive element 120. At this time power stored by the capacitive element 120 is consumed by the load circuit 110. Furthermore, at this time an electric current 102 which flows in the counterclockwise direction in the electronic device 100 is interrupted by the breaker circuit 160, an electric current does not flow through the voltage division resistor 140b, and voltage generated between both ends of the voltage division resistor 140b, that is to say, monitored voltage is 0 V. Accordingly, the monitor section 140 detects that voltage at the receiving end of the electronic device 100 has dropped, and transmits an output signal to the inrush current control section 150. The inrush current control section 150 which receives the output signal exercises control so as to immediately put the FET gate control circuit 153 into an OFF state.

Next, the state of a circuit in the electronic device 100 at the time of plugging the electronic device 100 into the power supply apparatus 200 will be described with reference to FIG. 5.

When the electronic device 100 is plugged into the power supply apparatus 200, the monitor section 140 detects by voltage generated between both ends of the voltage division resistor 140b that voltage at the receiving end of the electronic device 100 has been restored, and transmits an output signal to the inrush current control section 150. The inrush current control section 150 which receives the output signal exercises control so as to gradually decrease the resistance of the switching element 130 in an OFF state and put the switching element 130 into an ON state. By doing so, charging current to the capacitive element 120 is controlled and an electric current 103 flows in the electronic device 100.

The waveforms of operation at the time of unplugging and plugging an electronic device (not illustrated) taken as an example for comparison and the electronic device 100 according to the second embodiment will now be described with reference to FIGS. 6 and 7.

Figure 6:
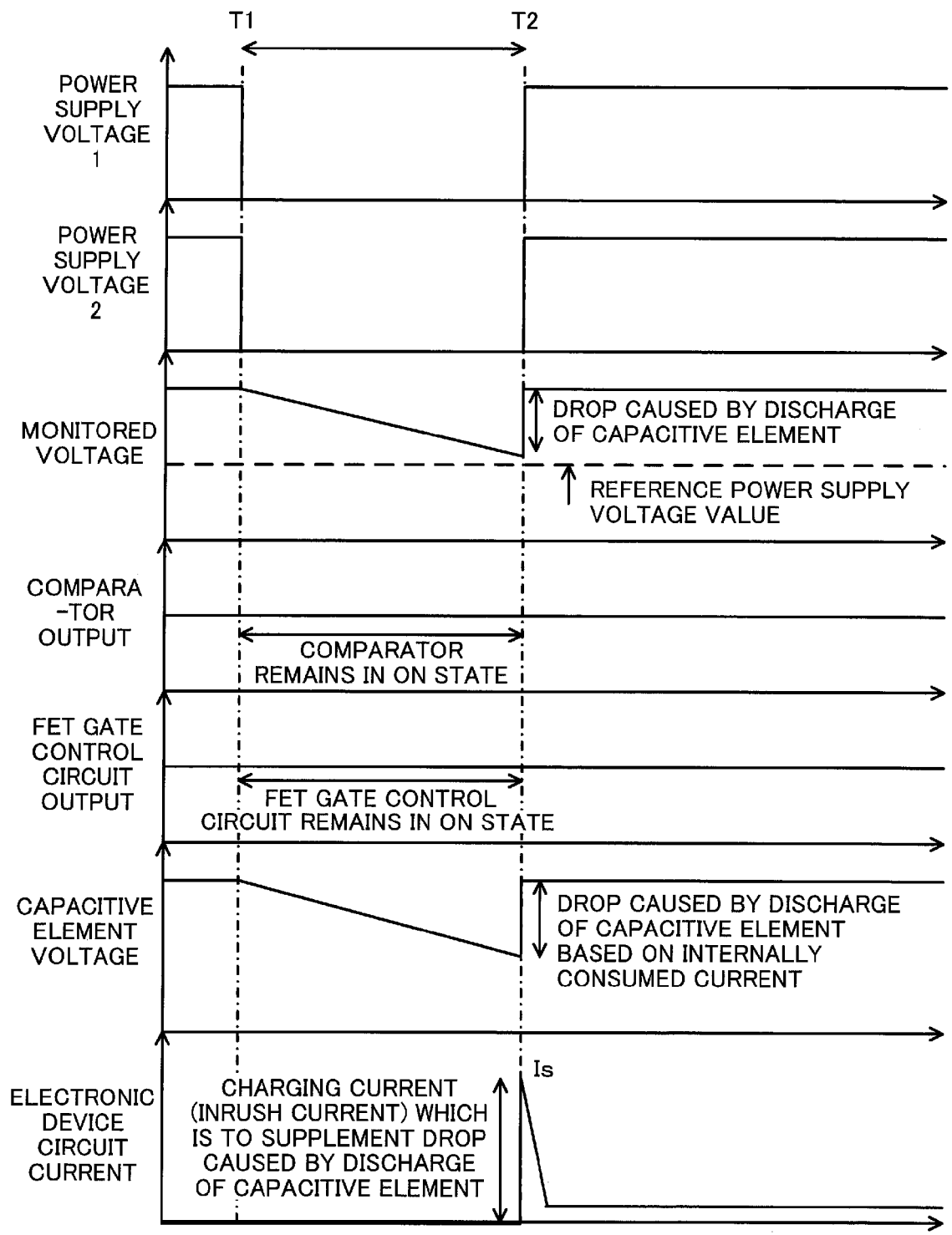
FIG. 6 indicates the waveforms of operation at the time of unplugging and plugging an electronic device taken as an example for comparison.

FIG. 6 indicates the waveforms of operation at the time of unplugging and plugging an electronic device taken as an example for comparison. It is assumed that when an electronic device taken as an example for comparison is unplugged from a power supply apparatus, a switching element remains in an ON state.

In FIG. 6, Power Supply Voltage 1 and Power Supply voltage 2 indicate the waveforms of voltage of two power supplies at a receiving end of the electronic device. Monitored Voltage indicates voltage generated between both ends of a voltage division resistor (corresponding to the voltage division resistor 140b of the electronic device 100). Reference Power Supply voltage value indicates a voltage value of a reference power supply. Comparator Output indicates output from a comparator. FET Gate Control Circuit Output indicates output from an FET gate control circuit. Capacitive Element voltage indicates voltage generated between both ends of a capacitive element. Electronic Device Circuit Current indicates an electric current which flows in a circuit in the electronic device.

A circuit state in the electronic device at the time of unplugging and plugging the electronic device will be described with reference to FIG. 6. When the electronic device is unplugged from the power supply apparatus (time T1), the power supply voltage 1 or 2, which is voltage at the receiving end of the electronic device, drops. However, the monitored voltage also drops gradually with a discharge of the capacitive element. When the electronic device is plugged again into the power supply apparatus before the monitored voltage becomes lower than or equal to the reference power supply voltage value (time T2), the comparator remains in an ON state. As a result, the FET gate control circuit exercises control so as to keep an FET in an ON state. When voltage is applied to the electronic device by the power supply apparatus in this state by plugging the electronic device into the power supply apparatus, the difference between the power supply voltage 1 or 2 and residual voltage of the capacitive element flows in as charging current. That is to say, excessive inrush current Is flows in a circuit in the electronic device.

Time for which the capacitive element discharges changes according to a state in which the electronic device consumes an electric current. When the electronic device is in a standby state and consumes the least electric current, time for which the capacitive element discharges is longest. This time corresponds to a period from the time when the electronic device is plugged into the power supply apparatus to the time when the electronic device starts. In this period, for example, chattering of terminals via which the electronic device and the power supply apparatus are electrically connected may occur or unplugging and plugging may be repeated in a short period of time on the basis of a state in which the terminals are touching (in the case of a user judging that a state in which the terminals are touching is incomplete, for example).

For example, it is assumed that the input impedance of the electronic device in a standby state is 100 kΩ, that the capacitance of the capacitive element, which is a capacitor, is 100 μF, that voltage supplied from the power supply apparatus is 48 V, and that input monitoring voltage of an inrush current control section is 35 V. When the electronic device is unplugged, time T it takes for voltage generated between both ends of the capacitive element to drop from 48 V to 35 V is given by $$T = -100\ \text{k}\Omega \times 100\ \mu\text{F} \times (35\ \text{V}/48\ \text{V}) = 3.158\ \text{s}$$

That is to say, it takes more than three seconds for voltage generated between both ends of the capacitive element to drop from 48 V to 35 V.

If the terminals of the electronic device touch and part from the terminals of the power supply apparatus many times in the time T, a hot swap between the electronic device and the power supply apparatus is repeated many times in a short period of time. As a result, inrush current flows many times in a circuit in the electronic device.

Furthermore, in order to make the capacitive element discharge in a short period of time, a discharge resistor may be used for connecting both electrodes of the capacitive element. In addition, in order to make the capacitive element discharge in a short period of time, the resistance value of the discharge resistor needs to be set to a low value. However, if a discharge resistor is used, much power is consumed by the discharge resistor at the time of normal operation of the electronic device. As a result, the power consumption of the electronic device itself increases and a great deal of heat is generated. Accordingly, the use of a discharge resistor is not proper from the viewpoint of energy saving.

Figure 7:
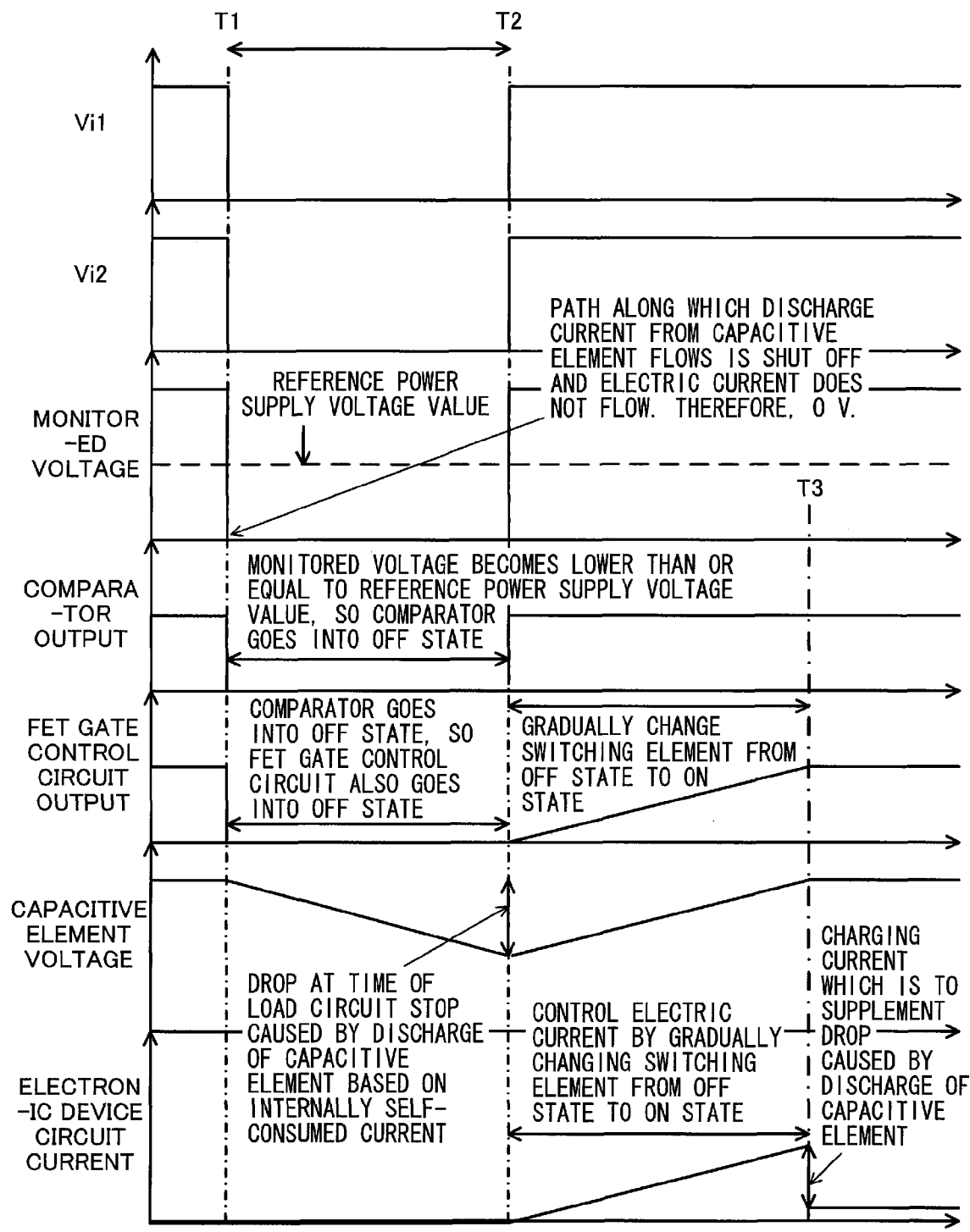
FIG. 7 indicates the waveforms of operation at the time of unplugging and plugging the electronic device according to the second embodiment.

FIG. 7 indicates the waveforms of operation at the time of unplugging and plugging the electronic device according to the second embodiment.

In FIG. 7, Vi1 and Vi2 indicate the waveforms of voltage of the two power supplies at the receiving end of the electronic device 100. Vi1 indicates the waveform of voltage between the terminals 170 and 171. Vi2 indicates the waveform of voltage between the terminals 170 and 172. Monitored Voltage indicates voltage generated between both ends of the voltage division resistor 140b. Reference Power Supply Voltage Value indicates a voltage value of the reference power supply 152. Comparator Output indicates output from the comparator 151. FET Gate Control Circuit Output indicates output from the FET gate control circuit 153. Capacitive Element Voltage indicates voltage generated between both ends of the capacitive element 120. Electronic Device Circuit Current indicates an electric current which flows in a circuit in the electronic device 100.

A circuit state in the electronic device 100 at the time of unplugging and plugging the electronic device 100 will be described with reference to FIG. 7. When the electronic device 100 is unplugged from the power supply apparatus 200 (time T1), Vi1 or Vi2, which is voltage at the receiving end of the electronic device 100, drops. As a result, the capacitive element voltage gradually drops with a discharge of the capacitive element 120. However, one end of the monitor section 140 is connected to the capacitive element 120 via the diodes 161 and 162, so discharge current from the capacitive element 120 is interrupted. Accordingly, the monitor section 140 can detect Vi1 and Vi2 without being influenced by voltage generated between both ends of the capacitive element 120. As a result, when the monitored voltage becomes 0 V (that is to say, the monitored voltage becomes lower than the reference power supply voltage value), the comparator 151 goes into an OFF state. The comparator output is inverted and the FET gate control circuit 153 goes into an OFF state. When the FET gate control circuit 153 goes into an OFF state, the FET gate control circuit output becomes 0. Accordingly, control is exercised so as to put the FET, which is the switching element 130, into an OFF state.

When the electronic device 100 is plugged into the power supply apparatus 200 after the unplugging (time T2), the monitored voltage becomes higher than or equal to the reference power supply voltage value. As a result, the comparator output is inverted and the FET gate control circuit 153 operates. The FET gate control circuit 153 gradually increases the FET gate control circuit output. As a result, gate voltage of the FET gate 131 of the switching element 130 increases and ON-state resistance between a drain and a source of the FET gate 131 gradually decreases. Accordingly, the capacitive element 120 is gradually charged. This prevents excessive inrush current from flowing in a circuit in the electronic device 100.

After that, when the FET gate 131 completely goes into an ON state and the resistance value of the FET gate 131 is minimized (time T3), charging the capacitive element 120 is completed according to voltage supplied at this time to the capacitive element 120 and voltage generated between both ends of the capacitive element 120 reaches a determined value. As a result, charging current to the capacitive element 120 becomes 0 A and an electric current which flows in the electronic device 100 stabilizes.

Figure 8:
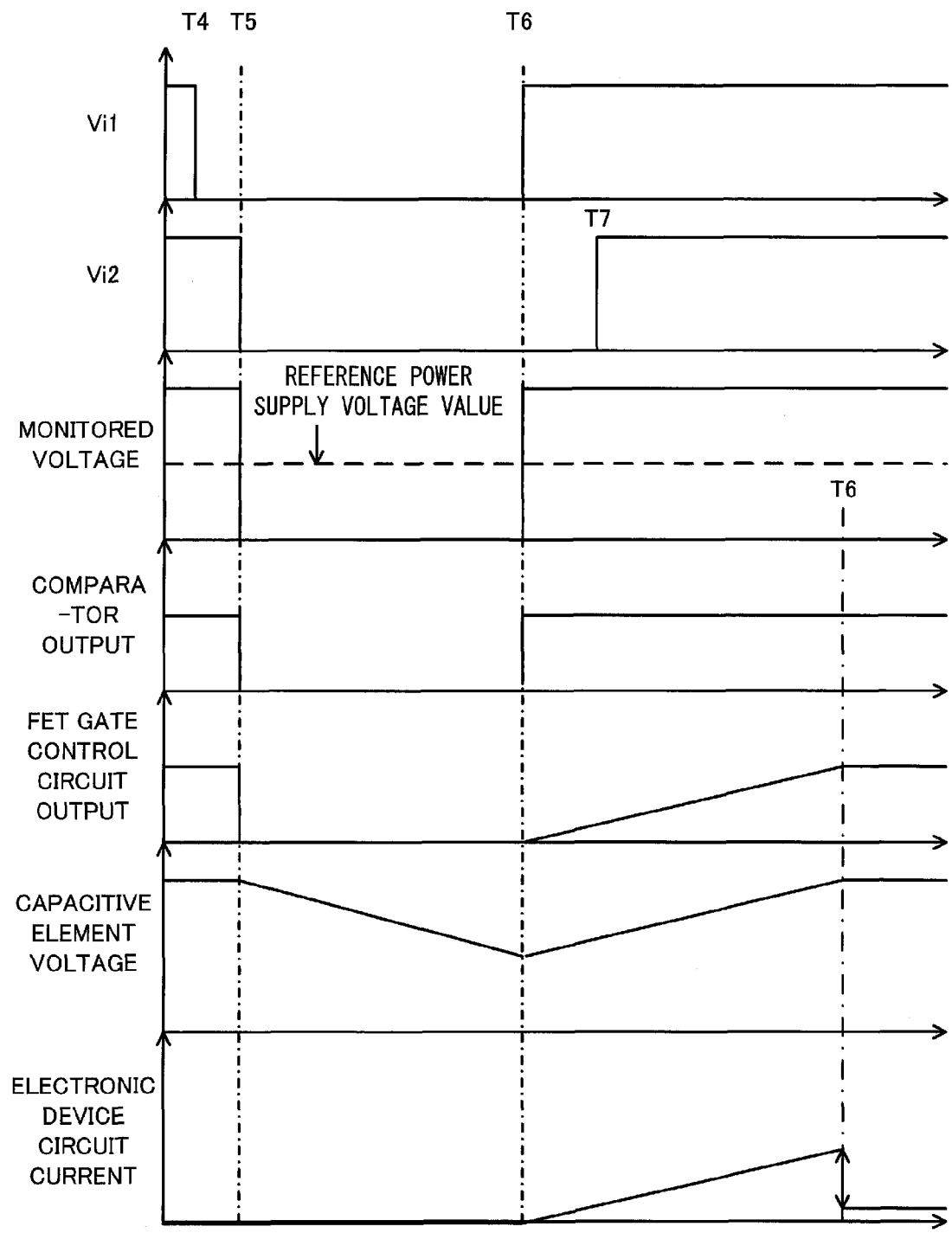
FIG. 8 indicates the waveforms of operation performed at the time of plugging the electronic device according to the second embodiment in the case of there being the time difference in the application of voltage between two power supplies.

FIG. 8 indicates the waveforms of operation performed at the time of plugging the electronic device according to the second embodiment in the case of there being the time difference in the application of voltage between the two power supplies.

Furthermore, there are cases where the terminals 170 through 172 do not touch or part from the terminals 270 through 272, respectively, at the same timing at the time of plugging or unplugging the electronic device 100 and where the two power supplies are not disconnected or connected at the same time. Even in such cases, the inrush current control section 150 controls the switching element 130. This prevents inrush current from flowing. A circuit state in the electronic device 100 which arises in such cases will be described with reference to FIG. 8.

In FIG. 8, Vi1 and Vi2 indicate the waveforms of voltage of the two power supplies at the receiving end of the electronic device 100. Vi1 indicates the waveform of voltage between the terminals 170 and 171. Vi2 indicates the waveform of voltage between the terminals 170 and 172. Monitored Voltage indicates voltage generated between both ends of the voltage division resistor 140b. Reference Power Supply Voltage Value indicates a voltage value of the reference power supply 152. Comparator Output indicates output from the comparator 151. FET Gate Control Circuit Output indicates output from the FET gate control circuit 153. Capacitive Element Voltage indicates voltage generated between both ends of the capacitive element 120. Electronic Device Circuit Current indicates an electric current which flows in a circuit in the electronic device 100. This is the same with FIG. 7.

As indicated in FIG. 8, Vi1 (power supply 281) is disconnected at time T4 and then Vi2 (power supply 282) is disconnected at time T5. After that, Vi1 is supplied at time T6 and then Vi2 is supplied at time T7. The monitor section 140 finds the logical sum of results obtained by monitoring the power supplies 281 and 282. Therefore, when the electronic device 100 is disconnected from both of the power supplies 281 and 282, that is to say, both of Vi1 and Vi2 drop, the monitor section 140 detects a drop in voltage at the receiving end of the electronic device 100 and outputs an output signal. Furthermore, when one of the power supplies 281 and 282 is connected to the electronic device 100, that is to say, when one of Vi1 and Vi2 rises, the monitor section 140 detects a rise in voltage at the receiving end of the electronic device 100 and outputs an output signal.

On the basis of the output signal from the monitor section 140, the comparator 151 operates in the same way as it operates in the case of the power supplies 281 and 282 being disconnected and connected at the same time. As a result, the FET gate control circuit 153 and the switching element 130 also operate in the same way as they operate in the case of the power supplies 281 and 282 being disconnected and connected at the same time. Accordingly, even if the two power supplies are not disconnected from or connected to the electronic device 100 at the same time, the electronic device 100 operates in the same way as it operates in the case of the power supplies 281 and 282 being disconnected and connected at the same time.

As has been described, when the electronic device 100 is unplugged from the power supply apparatus 200, the electronic device 100 immediately puts the inrush current control section 150 into an OFF state regardless of a state of a discharge of the capacitive element 120. By doing so, inrush current which flows at the time of plugging the electronic device 100 after unplugging in a state in which a hot swap can be performed between the electronic device 100 and the power supply apparatus 200 can be controlled.

In addition, even when connector chattering occurs in plugging and unplugging work for maintenance or replacement or power is applied and disconnected in a short period of time by a maintenance person, the inrush current control section 150 can control inrush current.

Furthermore, there is no need of a discharge resistor for the capacitive element 120. As a result, energy loss can be controlled.

Moreover, the breaker circuit 160 includes the diodes 161 and 162 which are connected so that an electric current from the power supply apparatus 200 will flow in the forward direction. As a result, the breaker circuit 160 can interrupt by the diodes 161 and 162 discharge current which flows from the capacitive element 120 to the monitor section 140 at the time of unplugging the electronic device 100.

In addition, the back flow preventing circuit 190 includes the diodes 191 and 192 whose cathode-side terminals are connected to the cathode-side terminals of the diodes 161 and 162 respectively and which pass an electric current through the monitor section 140 in one direction. As a result, when at least one of voltage on the cathode side of the diode 161 or 162 and voltage supplied from the power supply apparatus 200 is applied, the monitor section 140 can output an ON signal to the inrush current control section 150.

Furthermore, the diodes 161 and 162 are also used for preventing an electric current which flows from the two power supplies 281 and 282 included in the power supply apparatus 200 from flowing backward. This makes it possible to realize the function in this embodiment while checking an increase in the number of new parts.

Moreover, when voltage monitored by the monitor section 140 is zero, the inrush current control section 150 controls the switching element 130 so as to make its resistance infinite. Therefore, inrush current which flows at the time of plugging the electronic device 100 after unplugging in a state in which a hot swap can be performed between the electronic device 100 and the power supply apparatus 200 can be controlled.

(Third Embodiment)

A third embodiment will now be described in detail with reference to the drawing. The differences between the above second embodiment and a third embodiment will mainly be described. The same numerals will be used for the same components and description of them will be omitted. In a third embodiment a common terminal is used on a minus side of a power supply apparatus and a power supply section includes n (n is a natural number greater than or equal to 3) power supplies.

Figure 9:
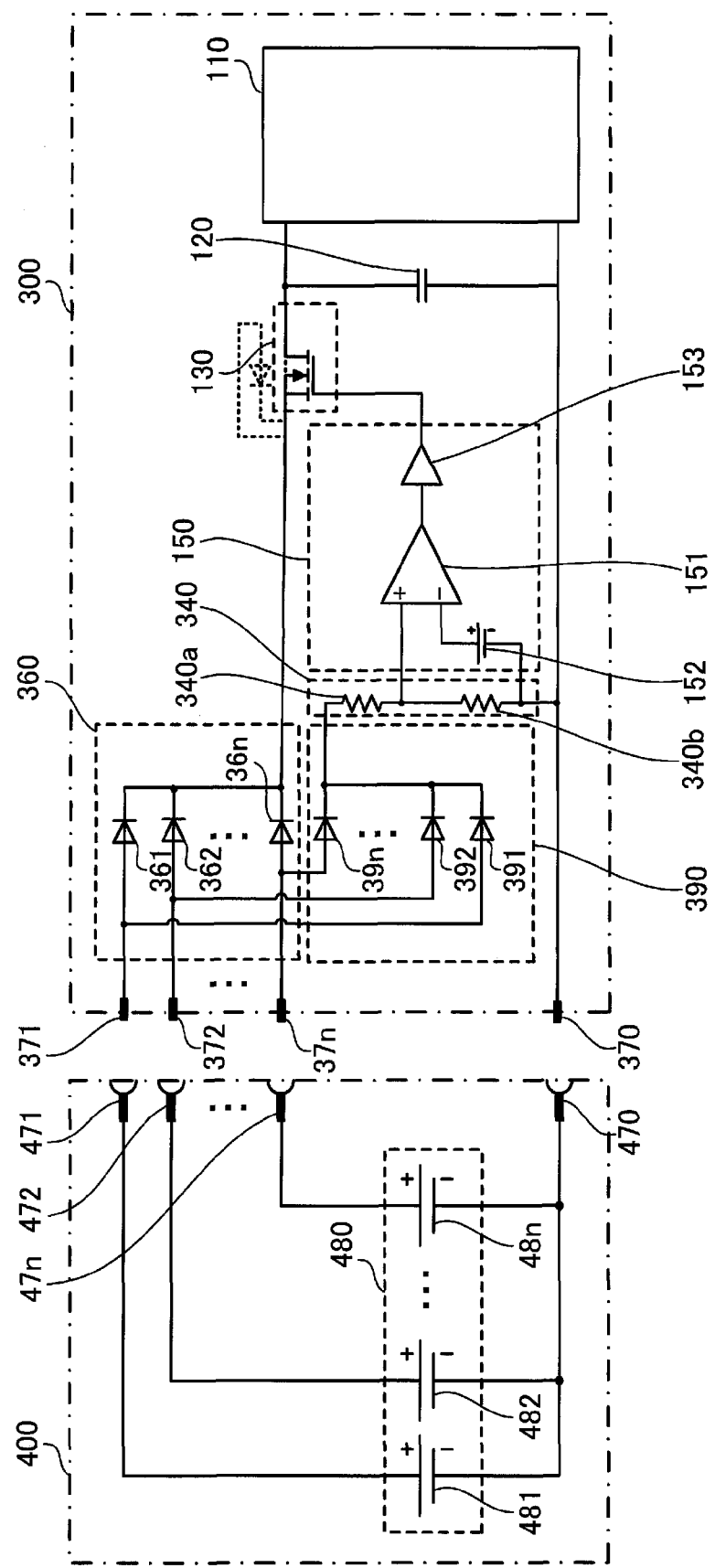
FIG. 9 is a view for describing an electronic device according to a third embodiment.

FIG. 9 is a view for describing an electronic device according to a third embodiment. As illustrated in FIG. 9, an electronic device 300 includes a load circuit 110, a capacitive element 120, a switching element 130, a monitor section 340, an inrush current control section 150, a breaker circuit 360, terminals 370, 371, 372, . . . , and 37n and a back flow preventing circuit 390. A hot swap can be performed between the electronic device 300 and a power supply apparatus 400.

The power supply apparatus 400 includes terminals 470, 471, 472, . . . , and 47n and a power supply section 480. The electronic device 300 and the power supply apparatus 400 can be connected electrically via the terminals 370 through 37n included in the electronic device 300 and the terminals 470 through 47n included in the power supply apparatus 400.

Furthermore, the monitor section 340 includes voltage division resistors 340a and 340b. The inrush current control section 150 includes a comparator 151, a reference power supply 152, and an FET gate control circuit 153. This is the same with the second embodiment. The breaker circuit 360 includes n diodes 361, 362, . . . , and 36n. The back flow preventing circuit 390 includes n diodes 391, 392, . . . , and 39n. The power supply section 480 includes n power supplies 481, 482, . . . , and 48n which are direct-current power supplies.

The load circuit 110 realizes the function of the electronic device 300 by the use of power supplied from the power supply apparatus 400. This is the same with the second embodiment.

The capacitive element 120 is an input capacitor which stabilizes power supplied to the load circuit 110. This is the same with the second embodiment.

The switching element 130 controls an electric current which flows in a circuit in the electronic device 300. This is the same with the second embodiment.

The monitor section 340 is connected to the terminal 370 on a plus side of voltage supplied to the electronic device 300. This is the same with the monitor section 140 in the second embodiment. The monitor section 340 monitors voltage supplied to the electronic device 300, and outputs voltage, which is a monitoring result, to the inrush current control section 150. Furthermore, the monitor section 340 is connected in parallel with the capacitive element 120. The monitor section 340 monitors voltage on an anode side of the diode 361, 362, . . . , or 36n and input voltage supplied from the power supply apparatus 400, and outputs the logical sum of results obtained by the voltage monitoring.

The voltage division resistors 340a and 340b monitor input voltage. This is the same with the voltage division resistors 140a and 140b in the second embodiment. The voltage division resistors 340a and 340b are set so that when the power supply apparatus 400 supplies normal voltage to the electronic device 300, the potential difference between both ends of the voltage division resistor 340b will be greater than or equal to reference voltage supplied from the reference power supply 152.

The inrush current control section 150 controls the switching element 130 on the basis of voltage detected by the monitor section 140. This is the same with the second embodiment. The inrush current control section 150 changes the resistance of the switching element 130 on the basis of voltage monitored by the monitor section 140. By doing so, the inrush current control section 150 can control inrush current which flows at the time of plugging the electronic device 300 after unplugging in a state in which a hot swap can be performed between the electronic device 300 and the power supply apparatus 400. When voltage monitored by the monitor section 340 is zero, the inrush current control section 150 controls the switching element 130 so as to make its resistance infinite. When the electronic device 300 is unplugged from the power supply apparatus 400, the inrush current control section 150 sets the resistance of the switching element 130 to a high value. This makes it possible to control inrush current which flows at the time of plugging the electronic device 300 into the power supply apparatus 400 after the unplugging. In addition, when the electronic device 300 is plugged into the power supply apparatus 400, the inrush current control section 150 gradually decreases the resistance of the switching element 130. This makes it possible to control inrush current which flows at the time of plugging the electronic device 300 into the power supply apparatus 400.

The comparator 151 compares reference voltage supplied from the reference power supply 152 with voltage generated between both ends of the voltage division resistor 340b of the monitor section 340. This is the same with the second embodiment.

The reference power supply 152 supplies to the comparator 151 voltage used as reference for comparison. This is the same with the second embodiment. The FET gate control circuit 153 controls the switching element 130, which is an FET, and controls inrush current by gradually decreasing the resistance of the switching element 130. This is the same with the second embodiment.

It is assumed that the electronic device 300 is unplugged from the power supply apparatus 400 and that input voltage supplied from the power supply apparatus 400 drops. Then discharge current which flows from the capacitive element 120 is interrupted by the breaker circuit 360, an electric current does not flow through the monitor section 340, and voltage generated between both ends of the voltage division resistor 340b, that is to say, monitored voltage is 0 V. The comparator 151 makes a comparison. When there is no potential difference between potential on the anode side of the diode 361, 362, . . . , or 36n and potential on the minus side of the power supplies of the power supply apparatus 400, the inrush current control section 150 exercises control so as to change the switching element 130 from an ON state to an OFF state. This prevents charging current from flowing to the capacitive element 120 at the time of the electronic device 300 being plugged into the power supply apparatus 400 later.

Furthermore, it is assumed that the electronic device 300 is plugged into the power supply apparatus 400 after unplugging. Then an electric current based on input voltage supplied from the power supply apparatus 400 flows in a circuit in the electronic device 300. As a result, voltage generated between both ends of the voltage division resistor 340b, that is to say, monitored voltage increases. The comparator 151 makes a comparison. When the potential difference between potential on the anode side of the diode 361, 362, . . . , or 36n and potential on the minus side of the power supplies of the power supply apparatus 400 is greater than or equal to reference voltage supplied from the reference power supply 152, the inrush current control section 150 exercises control so as to gradually decrease the resistance of the switching element 130 in an OFF state and put the switching element 130 into an ON state. This controls an increase in charging current which flows to the capacitive element 120 after the plugging of the electronic device 300 into the power supply apparatus 400.

The breaker circuit 360 is placed between the switching element 130 and the monitor section 340. When the electronic device 300 is unplugged from the power supply apparatus 400, the breaker circuit 360 prevents, by the diodes 361, 362, . . . , and 36n, electric charges stored by the capacitive element 120 from flowing into the monitor section 340.

The diodes 361, 362, . . . , and 36n are back flow preventing diodes. That is to say, the diodes 361, 362, . . . , and 36n are used for integrating the multiple power supplies into one in a circuit, interrupting return current among the multiple power supplies 481, 482, . . . , and 48n included in the power supply section 480, and preventing an electric current which flows from the power supply section 480 from flowing backward.

The diodes 361, 362, . . . , and 36n are connected so that an electric current from the power supply apparatus 400 will flow in a forward direction. Furthermore, when the electronic device 300 is unplugged from the power supply apparatus 400, the diodes 361, 362, . . . , and 36n prevent discharge current based on electric charges stored by the capacitive element 120 from flowing into the monitor section 340. The diodes 361, 362, . . . , and 36n are taken as an example of a breaker circuit.

The terminals 370, 371, 372, . . . , and 37n can be connected electrically to the terminals 470, 471, 472, . . . , and 47n respectively. Power is supplied from the power supply apparatus 400 to the electronic device 300 via the terminals 370 through 37n and 470 through 47n.

The back flow preventing circuit 390 is connected in series with the monitor section 340. The back flow preventing circuit 390 interrupts return current among the multiple power supplies 481, 482, . . . , and 48n included in the power supply section 480.

Anode-side terminals of the diodes 391, 392, . . . , and 39n are connected to anode-side terminals of the diodes 361, 362, . . . , and 36n respectively. The diodes 391, 392, . . . , and 39n interrupt return current among the multiple power supplies 481, 482, . . . , and 48n included in the power supply section 480.

The power supply section 480 includes the n power supplies 481, 482, . . . , and 48n which supply direct-current power used by the electronic device 300. The power supply section 480 supplies power to the electronic device 300 by the use of the power supplies 481, 482, . . . , and 48n connected in parallel. As a result, the reliability of the power supply section 480 is increased.

As stated above, when the electronic device 300 is unplugged from the power supply apparatus 400, discharge current from the capacitive element 120 is interrupted by the breaker circuit 360 and voltage generated between both ends of the voltage division resistor 340b, that is to say, monitored voltage becomes 0 V. The comparator 151 detects that the monitored voltage is lower than or equal to reference voltage supplied from the reference power supply 152. As a result, the inrush current control section 150 exercises control so as to change the switching element 130 from an ON state to an OFF state.

When the electronic device 300 is plugged into the power supply apparatus 400 after the unplugging, an electric current supplied from the power supply section 480 flows through the monitor section 340 and voltage generated between both ends of the voltage division resistor 340b, that is to say, monitored voltage becomes higher than or equal to the reference voltage. The comparator 151 detects that the monitored voltage is higher than or equal to the reference voltage supplied from the reference power supply 152. As a result, the inrush current control section 150 exercises control so as to gradually decrease the resistance of the switching element 130 in an OFF state and put the switching element 130 into an ON state. By doing so, charging current to the capacitive element 120 is controlled and an electric current flows in the electronic device 300.

As has been described, by controlling charging current to the capacitive element 120, a rapid increase in electric current can be controlled in a circuit in the electronic device 300 at the time of the electronic device 300 being plugged into the power supply apparatus 400. Accordingly, inrush current can be controlled.

In this embodiment, the power supply section 480 includes the n power supplies 481 through 48n, the electronic device 300 includes the (n+1) terminals 370 through 37n, and the power supply apparatus 400 includes the (n+1) terminals 470 through 47n. However, the power supply apparatus 400 may include one or two power supplies. The number of terminals included in the electronic device 300 and the power supply apparatus 400 may be two or three according to the number of power supplies included in the power supply section 480.

Furthermore, in this embodiment the breaker circuit 360 includes the n diodes 361 through 36n. However, the number of diodes included in the breaker circuit 360 may be one or two according to the number of power supplies included in the power supply section 480.

In addition, in this embodiment the back flow preventing circuit 390 includes the n diodes 391 through 39n. However, the number of diodes included in the back flow preventing circuit 390 may be zero or two according to the number of power supplies included in the power supply section 480 (if one power supply is included in the power supply section 480, an electric current does not flow backward).

As has been described, when the electronic device 300 is unplugged from the power supply apparatus 400, the electronic device 300 immediately puts the inrush current control section 150 into an OFF state regardless of a state of a discharge of the capacitive element 120. By doing so, inrush current which flows at the time of plugging the electronic device 300 after unplugging in a state in which a hot swap can be performed between the electronic device 300 and the power supply apparatus 400 can be controlled. This is the same with the second embodiment.

(Fourth Embodiment)

A fourth embodiment will now be described in detail with reference to the drawing. The differences between the above second embodiment and a fourth embodiment will mainly be described. The same numerals will be used for the same components and description of them will be omitted. In a fourth embodiment a common terminal is used on a plus side of a power supply apparatus and a power supply section includes n power supplies.

Figure 10:
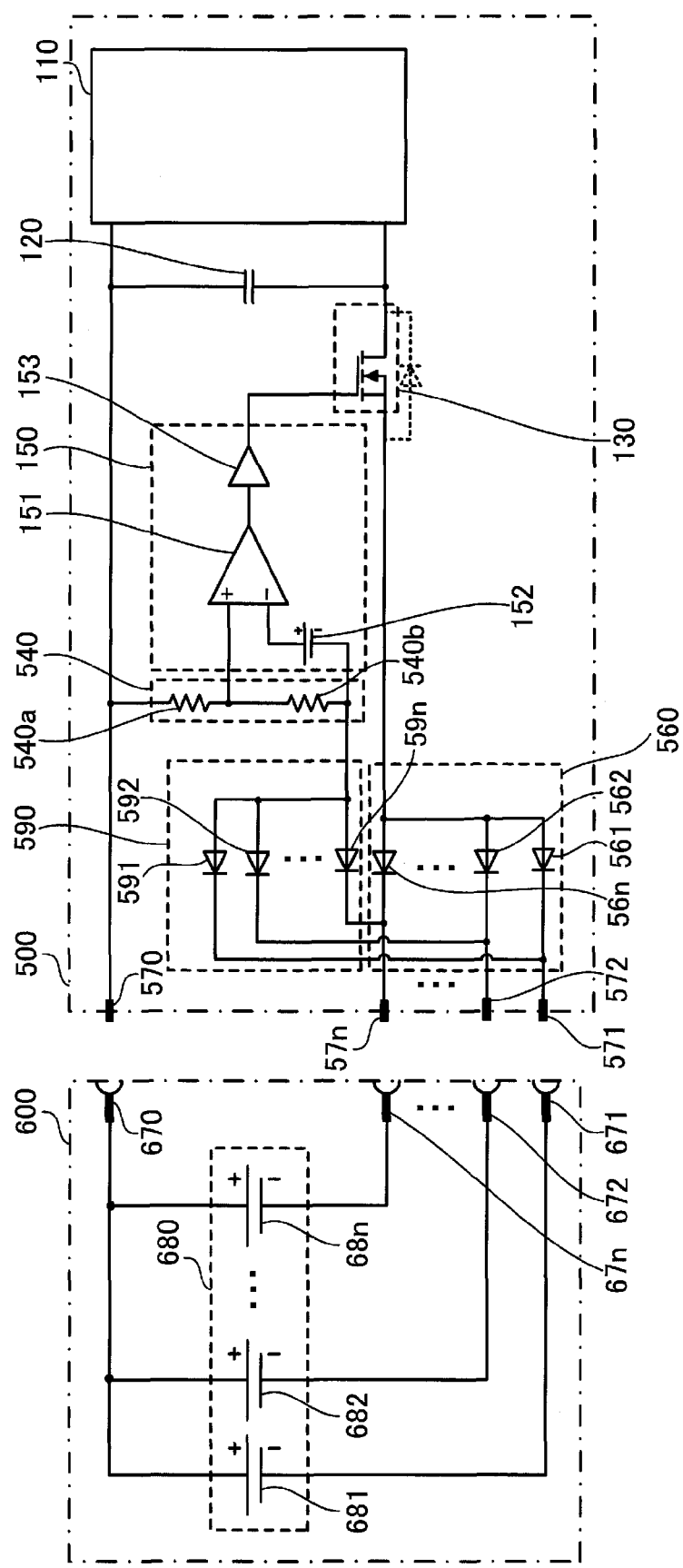
FIG. 10 is a view for describing an electronic device according to a fourth embodiment.

FIG. 10 is a view for describing an electronic device according to a fourth embodiment. As illustrated in FIG. 10, an electronic device 500 includes a load circuit 110, a capacitive element 120, a switching element 130, a monitor section 540, an inrush current control section 150, a breaker circuit 560, terminals 570, 571, 3572, . . . , and 57n and a back flow preventing circuit 590. A hot swap can be performed between the electronic device 500 and a power supply apparatus 600.

The power supply apparatus 600 includes terminals 670, 671, 672, . . . , and 67n and a power supply section 680. The electronic device 500 and the power supply apparatus 600 can be connected electrically via the terminals 570 through 57n included in the electronic device 500 and the terminals 670 through 67n included in the power supply apparatus 600.

Furthermore, the monitor section 540 includes voltage division resistors 540a and 540b. The inrush current control section 150 includes a comparator 151, a reference power supply 152, and an FET gate control circuit 153. This is the same with the second embodiment. The breaker circuit 560 includes n diodes 561, 562, . . . , and 56n. The back flow preventing circuit 590 includes n diodes 591, 592, . . . , and 59n. The power supply section 680 includes n power supplies 681, 682, . . . , and 68n which are direct-current power supplies.

The load circuit 110 realizes the function of the electronic device 500 by the use of power supplied from the power supply apparatus 600. This is the same with the second embodiment.

The capacitive element 120 is an input capacitor which stabilizes power supplied to the load circuit 110. This is the same with the second embodiment.

The switching element 130 controls an electric current which flows in a circuit in the electronic device 500. This is the same with the second embodiment.

The monitor section 540 is connected to the terminal 570 on a plus side of voltage supplied to the electronic device 500. This is the same with the monitor section 140 in the second embodiment. The monitor section 540 monitors voltage supplied to the electronic device 500, and outputs voltage, which is a monitoring result, to the inrush current control section 150. Furthermore, the monitor section 540 is connected in parallel with the capacitive element 120. The monitor section 540 monitors voltage on a cathode side of the diode 561, 562, ..., or 56n and input voltage supplied from the power supply apparatus 600, and outputs the logical sum of results obtained by the voltage monitoring.

The voltage division resistors 540a and 540b monitor input voltage. This is the same with the voltage division resistors 140a and 140b in the second embodiment. The voltage division resistors 540a and 540b are set so that when the power supply apparatus 600 supplies normal voltage to the electronic device 500, the potential difference between both ends of the voltage division resistor 540b will be greater than or equal to reference voltage supplied from the reference power supply 152.

The inrush current control section 150 controls the switching element 130 on the basis of voltage detected by the monitor section 540. This is the same with the second embodiment. The inrush current control section 150 changes the resistance of the switching element 130 on the basis of voltage monitored by the monitor section 540, and controls inrush current which flows at the time of performing a hot swap between the electronic device 500 and the power supply apparatus 600. When voltage monitored by the monitor section 540 is zero, the inrush current control section 150 controls the switching element 130 so as to make its resistance infinite. When the electronic device 500 is unplugged from the power supply apparatus 600, the inrush current control section 150 sets the resistance of the switching element 130 to a high value. This makes it possible to control inrush current which flows at the time of plugging the electronic device 500 into the power supply apparatus 600 after the unplugging. In addition, when the electronic device 500 is plugged into the power supply apparatus 600, the inrush current control section 150 gradually decreases the resistance of the switching element 130. This makes it possible to control inrush current which flows at the time of plugging the electronic device 500 into the power supply apparatus 600.

The comparator 151 compares reference voltage supplied from the reference power supply 152 with voltage generated between both ends of the voltage division resistor 540b of the monitor section 540. This is the same with the second embodiment.

The reference power supply 152 supplies to the comparator 151 voltage used as reference for comparison. This is the same with the second embodiment. The FET gate control circuit 153 controls the switching element 130, which is an FET, and controls inrush current by gradually decreasing the resistance of the switching element 130. This is the same with the second embodiment.

It is assumed that the electronic device 500 is unplugged from the power supply apparatus 600 and that input voltage supplied from the power supply apparatus 600 drops. Then discharge current which flows from the capacitive element 120 is interrupted by the breaker circuit 560, an electric current does not flow through the monitor section 540, and voltage generated between both ends of the voltage division resistor 540b, that is to say, monitored voltage is 0 V. The comparator 151 makes a comparison. When there is no potential difference between potential on the cathode side of the diode 561, 562, ..., or 56n and potential on the plus side of the power supplies of the power supply apparatus 600, the inrush current control section 150 exercises control so as to change the switching element 130 from an ON state to an OFF state. This prevents charging current from flowing to the capacitive element 120 at the time of the electronic device 500 being plugged into the power supply apparatus 600 later.

Furthermore, it is assumed that the electronic device 500 is plugged into the power supply apparatus 600 after unplugging. Then an electric current based on input voltage supplied from the power supply apparatus 600 flows in a circuit in the electronic device 500. As a result, voltage generated between both ends of the voltage division resistor 540b, that is to say, monitored voltage increases. The comparator 151 makes a comparison. When the potential difference between potential on the cathode side of the diode 561, 562, ..., or 56n and potential on the plus side of the power supplies of the power supply apparatus 600 is greater than or equal to reference voltage supplied from the reference power supply 152, the inrush current control section 150 exercises control so as to gradually decrease the resistance of the switching element 130 in an OFF state and put the switching element 130 into an ON state. This controls an increase in charging current which flows to the capacitive element 120 after the plugging of the electronic device 500 into the power supply apparatus 600.

The breaker circuit 560 is placed between the switching element 130 and the monitor section 540. When the electronic device 500 is unplugged from the power supply apparatus 600, the breaker circuit 560 prevents, by the diodes 561, 562, ..., and 56n, electric charges stored by the capacitive element 120 from flowing into the monitor section 540.

The diodes 561, 562, ..., and 56n are back flow preventing diodes. That is to say, the diodes 561, 562, ..., and 56n are used for integrating the multiple power supplies into one in a circuit, interrupting return current among the multiple power supplies 681, 682, ..., and 68n included in the power supply section 680, and preventing an electric current which flows from the power supply section 680 from flowing backward. The diodes 561, 562, ..., and 56n are connected so that an electric current from the power supply apparatus 600 will flow in a forward direction. Furthermore, when the electronic device 500 is unplugged from the power supply apparatus 600, the diodes 561, 562, ..., and 56n prevent discharge current based on electric charges stored by the capacitive element 120 from flowing into the monitor section 540. The diodes 561, 562, ..., and 56n are taken as an example of a breaker circuit.

The terminals 570, 571, 572, ..., and 57n can be connected electrically to the terminals 670, 671, 672, ..., and 67n respectively. Power is supplied from the power supply apparatus 600 to the electronic device 500 via the terminals 570 through 57n and 670 through 67n.

The back flow preventing circuit 590 is connected in series with the monitor section 540. The back flow preventing circuit 590 interrupts return current among the multiple power supplies 681, 682, ..., and 68n included in the power supply section 680.

Cathode-side terminals of the diodes 591, 592, ..., and 59n are connected to cathode-side terminals of the diodes 561, 562, ..., and 56n respectively. The diodes 591, 592, ..., and 59*n* interrupt return current among the multiple power supplies 681, 682, ..., and 68*n* included in the power supply section 680.

The power supply section 680 includes the n power supplies 681, 682, ..., and 68*n* which supply direct-current power used by the electronic device 500. The power supply section 680 supplies power to the electronic device 500 by the use of the power supplies 681, 682, ..., and 68*n* connected in parallel. As a result, the reliability of the power supply section 680 is increased.

As stated above, when the electronic device 500 is unplugged from the power supply apparatus 600, discharge current from the capacitive element 120 is interrupted by the breaker circuit 560 and voltage generated between both ends of the voltage division resistor 540*b*, that is to say, monitored voltage becomes 0 V. The comparator 151 detects that the monitored voltage is lower than or equal to reference voltage supplied from the reference power supply 152. As a result, the inrush current control section 150 exercises control so as to change the switching element 130 from an ON state to an OFF state.

When the electronic device 500 is plugged into the power supply apparatus 600 after the unplugging, an electric current supplied from the power supply section 680 flows through the monitor section 540 and voltage generated between both ends of the voltage division resistor 540*b*, that is to say, monitored voltage becomes higher than or equal to the reference voltage. The comparator 151 detects that the monitored voltage is higher than or equal to the reference voltage supplied from the reference power supply 152. As a result, the inrush current control section 150 exercises control so as to gradually decrease the resistance of the switching element 130 in an OFF state and put the switching element 130 into an ON state. By doing so, charging current to the capacitive element 120 is controlled and an electric current flows in the electronic device 500.

That is to say, by controlling charging current to the capacitive element 120, a rapid increase in electric current can be controlled in a circuit in the electronic device 500 at the time of the electronic device 500 being plugged into the power supply apparatus 600. Accordingly, inrush current can be controlled.

As has been described, when the electronic device 500 is unplugged from the power supply apparatus 600, the electronic device 500 immediately puts the inrush current control section 150 into an OFF state regardless of a state of a discharge of the capacitive element 120. By doing so, inrush current which flows at the time of plugging the electronic device 500 after unplugging in a state in which a hot swap can be performed between the electronic device 500 and the power supply apparatus 600 can be controlled. This is the same with the second embodiment.

(Fifth Embodiment)

A fifth embodiment will now be described in detail with reference to the drawing. The differences between the above second embodiment and a fifth embodiment will mainly be described. The same numerals will be used for the same components and description of them will be omitted. In a fifth embodiment a power supply section does not include multiple power supplies but includes one power supply.

Figure 11:
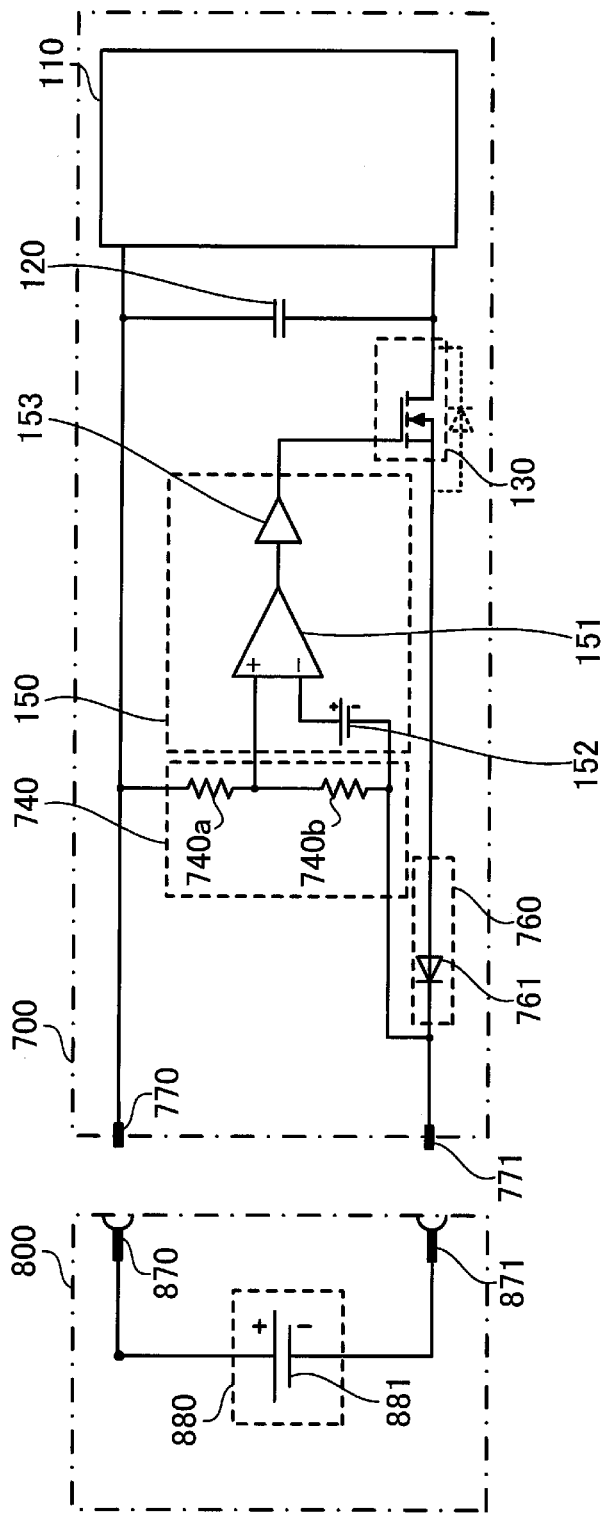
FIG. 11 is a view for describing an electronic device according to a fifth embodiment.

FIG. 11 is a view for describing an electronic device according to a fifth embodiment. As illustrated in FIG. 11, an electronic device 700 includes a load circuit 110, a capacitive element 120, a switching element 130, a monitor section 740, an inrush current control section 150, a breaker circuit 760, and terminals 770 and 771. A hot swap can be performed between the electronic device 700 and a power supply apparatus 800.

The power supply apparatus 800 includes terminals 870 and 871 and a power supply section 880. The electronic device 700 and the power supply apparatus 800 can be connected electrically via the terminals 770 and 771 included in the electronic device 700 and the terminals 870 and 871 included in the power supply apparatus 800.

Furthermore, the monitor section 740 includes voltage division resistors 740*a* and 740*b*. The inrush current control section 150 includes a comparator 151, a reference power supply 152, and an FET gate control circuit 153. This is the same with the second embodiment. The breaker circuit 760 includes a diode 761. The power supply section 880 includes a power supply 881 which is a direct-current power supply. In the first through fourth embodiments the elements for interrupting return current among the multiple power supplies are used as the breaker circuit. In this embodiment the power supply section 880 includes one power supply, which needs no elements for interrupting return current among multiple power supplies. However, the diode 761 is used as the breaker circuit 760 which prevents, at the time of the electronic device 700 being unplugged from the power supply apparatus 800, discharge current based on electric charges stored by the capacitive element 120 from flowing into the monitor section 740.

The load circuit 110 realizes the function of the electronic device 700 by the use of power supplied from the power supply apparatus 800. This is the same with the second embodiment.

The capacitive element 120 is an input capacitor which stabilizes power supplied to the load circuit 110. This is the same with the second embodiment.

The switching element 130 controls an electric current which flows in a circuit in the electronic device 700. This is the same with the second embodiment.

The monitor section 740 is connected to the terminal 770 on a plus side of voltage supplied to the electronic device 700. This is the same with the monitor section 140 in the second embodiment. The monitor section 740 monitors voltage supplied to the electronic device 700, and outputs voltage, which is a monitoring result, to the inrush current control section 150. Furthermore, the monitor section 740 is connected in parallel with the capacitive element 120. The monitor section 740 monitors voltage on a cathode side of the diode 761 and input voltage supplied from the power supply apparatus 800, and outputs the logical sum of results obtained by the voltage monitoring.

The voltage division resistors 740*a* and 740*b* monitor input voltage. This is the same with the voltage division resistors 140*a* and 140*b* in the second embodiment. The voltage division resistors 740*a* and 740*b* are set so that when the power supply apparatus 800 supplies normal voltage to the electronic device 700, the potential difference between both ends of the voltage division resistor 740*b* will be greater than or equal to reference voltage supplied from the reference power supply 152.

The inrush current control section 150 controls the switching element 130 on the basis of voltage detected by the monitor section 740. This is the same with the second embodiment. The inrush current control section 150 changes the resistance of the switching element 130 on the basis of voltage monitored by the monitor section 740, and controls inrush current which flows at the time of performing a hot swap between the electronic device 700 and the power supply apparatus 800. When voltage monitored by the monitor section 740 is zero, the inrush current control section 150 controls the switching element 130 so as to make its resistance infinite. When the electronic device 700 is unplugged from the power supply apparatus 800, the inrush current control section 150 sets the resistance of the switching element 130 to a high value. This makes it possible to control inrush current which flows at the time of plugging the electronic device 700 into the power supply apparatus 800 after the unplugging. In addition, when the electronic device 700 is plugged into the power supply apparatus 800, the inrush current control section 150 gradually decreases the resistance of the switching element 130. This makes it possible to control inrush current which flows at the time of plugging the electronic device 700 into the power supply apparatus 800.

The comparator 151 compares reference voltage supplied from the reference power supply 152 with voltage generated between both ends of the voltage division resistor 740b of the monitor section 740. This is the same with the second embodiment.

The reference power supply 152 supplies to the comparator 151 voltage used as reference for comparison. This is the same with the second embodiment. The FET gate control circuit 153 controls the switching element 130, which is an FET, and controls inrush current by gradually decreasing the resistance of the switching element 130. This is the same with the second embodiment.

It is assumed that the electronic device 700 is unplugged from the power supply apparatus 800 and that input voltage supplied from the power supply apparatus 800 drops. Then discharge current which flows from the capacitive element 120 is interrupted by the breaker circuit 760, an electric current does not flow through the monitor section 740, and voltage generated between both ends of the voltage division resistor 740b, that is to say, monitored voltage is 0 V. The comparator 151 makes a comparison. When there is no potential difference between potential on the cathode side of the diode 761 and potential on a plus side of the power supply of the power supply apparatus 800, the inrush current control section 150 exercises control so as to change the switching element 130 from an ON state to an OFF state. This prevents charging current from flowing to the capacitive element 120 at the time of the electronic device 700 being plugged into the power supply apparatus 800 later.

Furthermore, it is assumed that the electronic device 700 is plugged into the power supply apparatus 800 after unplugging. Then an electric current based on input voltage supplied from the power supply apparatus 800 flows in a circuit in the electronic device 700. As a result, voltage generated between both ends of the voltage division resistor 740b, that is to say, monitored voltage increases. The comparator 151 makes a comparison. When the potential difference between potential on the cathode side of the diode 761 and potential on the plus side of the power supply of the power supply apparatus 800 is greater than or equal to reference voltage supplied from the reference power supply 152, the inrush current control section 150 exercises control so as to gradually decrease the resistance of the switching element 130 in an OFF state and put the switching element 130 into an ON state. This controls an increase in charging current which flows to the capacitive element 120 after the plugging of the electronic device 700 into the power supply apparatus 800.

The breaker circuit 760 is placed between the switching element 130 and the monitor section 740. When the electronic device 700 is unplugged from the power supply apparatus 800, the breaker circuit 760 prevents, by the diode 761, electric charges stored by the capacitive element 120 from flowing into the monitor section 740.

The diode 761 is a back flow preventing diode and is used for preventing an electric current which flows from the power supply section 880 from flowing backward. The diode 761 is connected so that an electric current from the power supply apparatus 800 will flow in a forward direction. Furthermore, when the electronic device 700 is unplugged from the power supply apparatus 800, the diode 761 prevents discharge current based on electric charges stored by the capacitive element 120 from flowing into the monitor section 740. The diode 761 is taken as an example of a breaker circuit.

The terminals 770 and 771 can be connected electrically to the terminals 870 and 871 respectively. Power is supplied from the power supply apparatus 800 to the electronic device 700 via the terminals 770, 771, 870, and 871.

The power supply section 880 includes the power supply 881 which supplies direct-current power used by the electronic device 700.

As stated above, when the electronic device 700 is unplugged from the power supply apparatus 800, discharge current from the capacitive element 120 is interrupted by the breaker circuit 760 and voltage generated between both ends of the voltage division resistor 740b, that is to say, monitored voltage becomes 0 V. The comparator 151 detects that the monitored voltage is lower than or equal to reference voltage supplied from the reference power supply 152. As a result, the inrush current control section 150 exercises control so as to change the switching element 130 from an ON state to an OFF state.

When the electronic device 700 is plugged into the power supply apparatus 800 after the unplugging, an electric current supplied from the power supply section 880 flows through the monitor section 740 and voltage generated between both ends of the voltage division resistor 740b, that is to say, monitored voltage becomes higher than or equal to the reference voltage. The comparator 151 detects that the monitored voltage is higher than or equal to the reference voltage supplied from the reference power supply 152. As a result, the inrush current control section 150 exercises control so as to gradually decrease the resistance of the switching element 130 in an OFF state and put the switching element 130 into an ON state. By doing so, charging current to the capacitive element 120 is controlled and an electric current flows in the electronic device 700.

That is to say, by controlling charging current to the capacitive element 120, a rapid increase in electric current can be controlled in a circuit in the electronic device 700 at the time of the electronic device 700 being plugged into the power supply apparatus 800. Accordingly, inrush current can be controlled.

As has been described, when the electronic device 700 is unplugged from the power supply apparatus 800, the electronic device 700 immediately puts the inrush current control section 150 into an OFF state regardless of a state of a discharge of the capacitive element 120. By doing so, inrush current which flows at the time of plugging the electronic device 700 after unplugging in a state in which a hot swap can be performed between the electronic device 700 and the power supply apparatus 800 can be controlled. This is the same with the second embodiment.

(Sixth Embodiment)

A sixth embodiment will now be described in detail with reference to the drawing. The differences between the above second embodiment and a sixth embodiment will mainly be described. The same numerals will be used for the same components and description of them will be omitted. In a sixth embodiment a common terminal is used on a plus side of a power supply apparatus and a power supply section includes two power supplies. In addition, a transistor is used for performing switching between connecting voltage division resistors to the power supply section and disconnecting the voltage division resistors from the power supply section.

Figure 12:
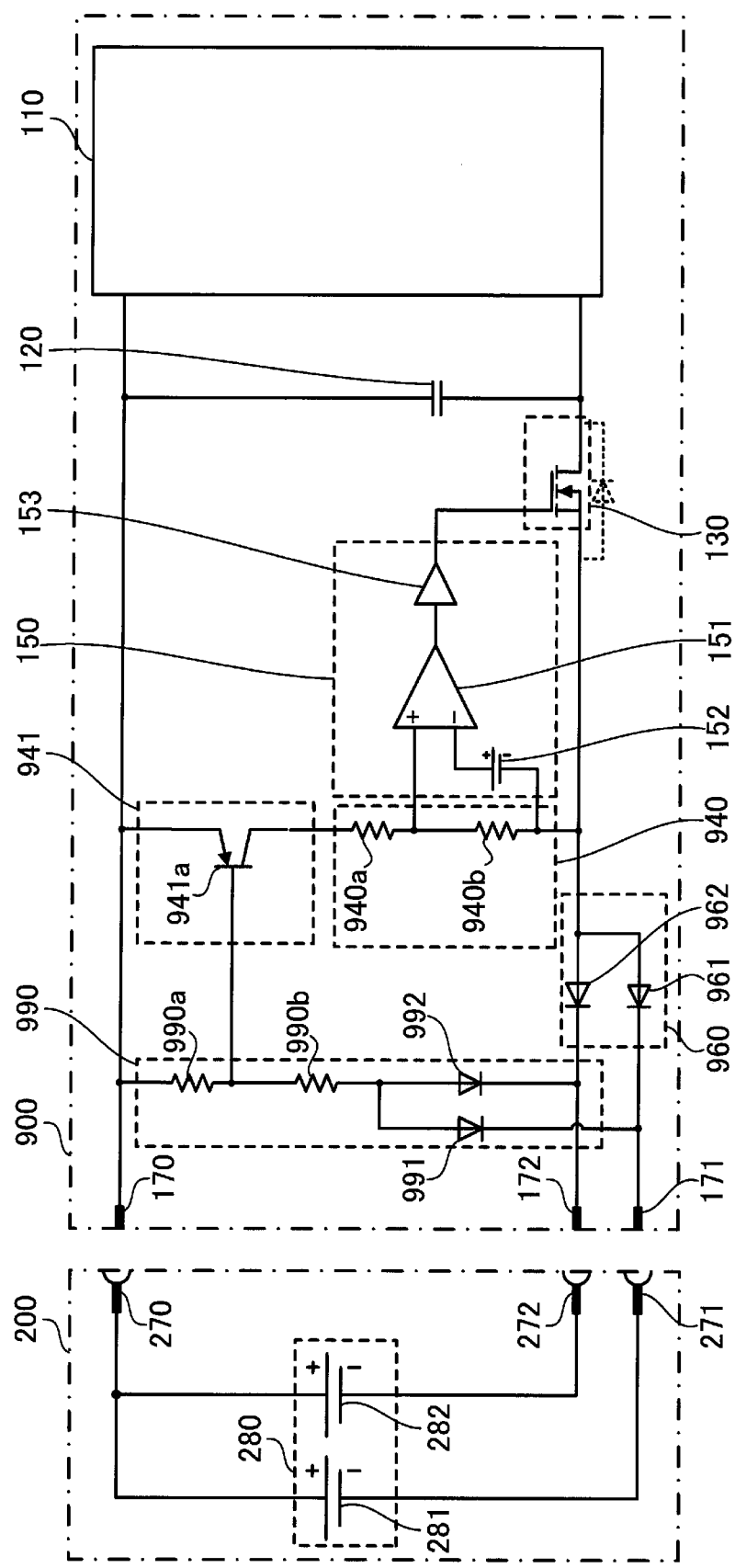
FIG. 12 is a view for describing an electronic device according to a sixth embodiment.

FIG. 12 is a view for describing an electronic device according to a sixth embodiment. As illustrated in FIG. 12, an electronic device 900 includes a load circuit 110, a capacitive element 120, a switching element 130, a monitor section 940, an on-off switch 941, an inrush current control section 150, a breaker circuit 960, terminals 170, 171, and 172 and an on-off switch control section 990. A hot swap can be performed between the electronic device 900 and a power supply apparatus 200.

The power supply apparatus 200 includes terminals 270, 271, and 272 and a power supply section 280. This is the same with the second embodiment. The electronic device 900 and the power supply apparatus 200 can be connected electrically via the terminals 170 through 172 included in the electronic device 900 and the terminals 270 through 272 included in the power supply apparatus 200.

Furthermore, the monitor section 940 includes voltage division resistors 940a and 940b. The on-off switch 941 includes a transistor 941a. The inrush current control section 150 includes a comparator 151, a reference power supply 152, and an FET gate control circuit 153. This is the same with the second embodiment. The breaker circuit 960 includes diodes 961 and 962. This is the same with the breaker circuit 160 in the second embodiment. The on-off switch control section 990 includes resistors 990a and 990b and diodes 991 and 992. The power supply section 280 includes power supplies 281 and 282 which are direct-current power supplies. This is the same with the second embodiment.

The load circuit 110 realizes the function of the electronic device 900 by the use of power supplied from the power supply apparatus 200. This is the same with the second embodiment.

The capacitive element 120 is an input capacitor which stabilizes power supplied to the load circuit 110. This is the same with the second embodiment.

The switching element 130 controls an electric current which flows in a circuit in the electronic device 900. This is the same with the second embodiment.

The monitor section 940 is connected to the terminal 170 on a plus side of voltage supplied to the electronic device 900. This is the same with the monitor section 140 in the second embodiment. The monitor section 940 monitors voltage supplied to the electronic device 900, and outputs voltage, which is a monitoring result, to the inrush current control section 150. Furthermore, the monitor section 940 is connected in parallel with the capacitive element 120. The monitor section 940 monitors voltage on a cathode side of the diode 961 or 962 and input voltage supplied from the power supply apparatus 200 via the transistor 941a, and outputs the logical sum of results obtained by the voltage monitoring.

The voltage division resistors 940a and 940b monitor input voltage supplied via the transistor 941a. This is the same with the voltage division resistors 140a and 140b in the second embodiment. The voltage division resistors 940a and 940b are set so that when the power supply apparatus 200 supplies normal voltage to the electronic device 900, the potential difference between both ends of the voltage division resistor 940b will be greater than or equal to reference voltage supplied from the reference power supply 152.

The on-off switch 941 performs switching between connecting the voltage division resistors 940a and 940b to the power supply section 280 and disconnecting the voltage division resistors 940a and 940b from the power supply section 280. When the electronic device 900 is unplugged from the power supply apparatus 200, the on-off switch 941 interrupts power supplied from the power supply section 280 to the voltage division resistors 940a and 940b.

The transistor 941a is a pnp transistor used for performing switching between connecting the voltage division resistors 940a and 940b to the power supply section 280 and disconnecting the voltage division resistors 940a and 940b from the power supply section 280. The transistor 941a is an example of an on-off switch which controls an electric current that flows through the voltage division resistor 940b of the monitor section 940. When the electronic device 900 is unplugged from the power supply apparatus 200, the transistor 941a interrupts an electric current which flows through the voltage division resistor 940b. A terminal on a collector side of the transistor 941a is connected to the voltage division resistors 940a and 940b. A terminal on an emitter side of the transistor 941a is connected to the terminal on the plus side of the power supply apparatus 200. A terminal on a base side of the transistor 941a is connected to a portion where the resistors 990a and 990b are connected.

When the electronic device 900 is unplugged from the power supply apparatus 200, the transistor 941a is disconnected from the power supply apparatus 200 and discharge current from the capacitive element 120 is interrupted by the breaker circuit 960. As a result, voltage applied to the terminal on the base side of the transistor 941a becomes 0. Accordingly, an electric current which flows through the voltage division resistor 940b is interrupted. In addition, when the electronic device 900 is plugged into the power supply apparatus 200, voltage supplied from the power supply section 280 is applied to the terminal on the base side of the transistor 941a via the resistor 990a. Accordingly, an electric current flows through the voltage division resistor 940b.

The inrush current control section 150 controls the switching element 130 on the basis of voltage detected by the monitor section 940. This is the same with the second embodiment. The inrush current control section 150 changes the resistance of the switching element 130 on the basis of voltage monitored by the monitor section 940. By doing so, the inrush current control section 150 can control inrush current which flows at the time of plugging the electronic device 900 after unplugging in a state in which a hot swap can be performed between the electronic device 900 and the power supply apparatus 200. When voltage monitored by the monitor section 940 is zero, the inrush current control section 150 controls the switching element 130 so as to make its resistance infinite. When the electronic device 900 is unplugged from the power supply apparatus 200, the inrush current control section 150 sets the resistance of the switching element 130 to a high value. This makes it possible to control inrush current which flows at the time of plugging the electronic device 900 into the power supply apparatus 200 after the unplugging. In addition, when the electronic device 900 is plugged into the power supply apparatus 200, the inrush current control section 150 gradually decreases the resistance of the switching element 130. This makes it possible to control inrush current which flows at the time of plugging the electronic device 900 into the power supply apparatus 200.

The comparator 151 compares reference voltage supplied from the reference power supply 152 with voltage generated between both ends of the voltage division resistor 940b of the monitor section 940. This is the same with the second embodiment.

The reference power supply 152 supplies to the comparator 151 voltage used as reference for comparison. This is the same with the second embodiment. The FET gate control circuit 153 controls the switching element 130, which is an FET, and controls inrush current by gradually decreasing the resistance of the switching element 130. This is the same with the second embodiment.

It is assumed that the electronic device 900 is unplugged from the power supply apparatus 200 and that input voltage supplied from the power supply apparatus 200 drops. Then discharge current which flows from the capacitive element 120 is interrupted by the breaker circuit 960, an electric current does not flow through the resistor 990a or 990b or the diode 991 or 992, and voltage applied to the terminal on the base side of the transistor 941a becomes 0 V. The transistor 941a goes into an OFF state, so an electric current does not flow through the monitor section 940. Accordingly, voltage generated between both ends of the voltage division resistor 940b, that is to say, monitored voltage is 0 V. The comparator 151 makes a comparison. When there is no potential difference between potential on the cathode side of the diode 961 or 962 and potential on the plus side of the power supplies of the power supply apparatus 200, the inrush current control section 150 exercises control so as to change the switching element 130 from an ON state to an OFF state. This prevents charging current from flowing to the capacitive element 120 at the time of the electronic device 900 being plugged into the power supply apparatus 200 later.

Furthermore, it is assumed that the electronic device 900 is plugged into the power supply apparatus 200 after unplugging. Then an electric current based on input voltage supplied from the power supply apparatus 200 flows in a circuit in the electronic device 900. As a result, an electric current flows through the resistors 990a and 990b and the diodes 991 and 992 and an electric current flows to the terminal on the base side of the transistor 941a. The transistor 941a goes into an ON state, so an electric current flows through the monitor section 940. Accordingly, voltage generated between both ends of the voltage division resistor 940b, that is to say, monitored voltage increases. The comparator 151 makes a comparison. When the potential difference between potential on the cathode side of the diode 961 or 962 and potential on the plus side of the power supplies of the power supply apparatus 200 is greater than or equal to reference voltage supplied from the reference power supply 152, the inrush current control section 150 exercises control so as to gradually decrease the resistance of the switching element 130 in an OFF state and put the switching element 130 into an ON state. This controls an increase in charging current which flows to the capacitive element 120 after the plugging of the electronic device 900 into the power supply apparatus 200.

The breaker circuit 960 is placed between the switching element 130 and the on-off switch control section 990. When the electronic device 900 is unplugged from the power supply apparatus 200, the breaker circuit 960 prevents, by the diodes 961 and 962, electric charges stored by the capacitive element 120 from flowing into the on-off switch control section 990.

The diodes 961 and 962 are back flow preventing diodes. That is to say, the diodes 961 and 962 are used for integrating the two power supplies into one in a circuit, interrupting return current between the two power supplies 281 and 282 included in the power supply section 280, and preventing an electric current which flows from the power supply section 280 from flowing backward. The diodes 961 and 962 are connected so that an electric current from the power supply apparatus 200 will flow in a forward direction. Furthermore, when the electronic device 900 is unplugged from the power supply apparatus 200, the diodes 961 and 962 prevent discharge current based on electric charges stored by the capacitive element 120 from flowing into the monitor section 940. The diodes 961 and 962 are taken as an example of a breaker circuit.

The terminals 170, 171, and 172 can be connected electrically to the terminals 270, 271, and 272 respectively. Power is supplied from the power supply apparatus 200 to the electronic device 900 via the terminals 170 through 172 and 270 through 272.

The on-off switch control section 990 includes the resistors 990a and 990b and the diodes 991 and 992.

The resistors 990a and 990b are voltage division resistors for controlling voltage at the terminal on the base side of the transistor 941a. One terminal of each of the resistors 990a and 990b is connected to the terminal on the base side of the transistor 941a. The other terminal of the resistor 990a is connected to the terminal on the plus side of the power supply apparatus 200. The other terminal of the resistor 990b is connected to terminals on an anode side of the diodes 991 and 992.

In addition, the on-off switch control section 990 interrupts return current between the two power supplies 281 and 282 included in the power supply section 280.

Terminals on a cathode side of the diodes 991 and 992 are connected to terminals on the cathode side of the diodes 961 and 962 respectively. The diodes 991 and 992 interrupt return current between the two power supplies 281 and 282 included in the power supply section 280.

The power supply section 280 includes the power supplies 281 and 282 which supply direct-current power used by the electronic device 900. The power supply section 280 supplies power to the electronic device 900 by the use of the power supplies 281 and 282 connected in parallel. As a result, the reliability of the power supply section 280 is increased.

As stated above, when the electronic device 900 is unplugged from the power supply apparatus 200, discharge current from the capacitive element 120 is interrupted by the transistor 941a and voltage generated between both ends of the voltage division resistor 940b, that is to say, monitored voltage becomes 0 V. The comparator 151 detects that the monitored voltage is lower than or equal to reference voltage supplied from the reference power supply 152. As a result, the inrush current control section 150 exercises control so as to change the switching element 130 from an ON state to an OFF state.

When the electronic device 900 is plugged into the power supply apparatus 200 after the unplugging, the transistor 941a goes into an ON state, an electric current supplied from the power supply section 280 flows through the monitor section 940, and voltage generated between both ends of the voltage division resistor 940b, that is to say, monitored voltage becomes higher than or equal to the reference voltage. The comparator 151 detects that the monitored voltage is higher than or equal to the reference voltage supplied from the reference power supply 152. As a result, the inrush current control section 150 exercises control so as to gradually decrease the resistance of the switching element 130 in an OFF state and put the switching element 130 into an ON state. By doing so, charging current to the capacitive element 120 is controlled and an electric current flows in the electronic device 900.

In this embodiment, the power supply section 280 includes the two power supplies 281 and 282, the electronic device 900 includes the three terminals 170 through 172, and the power supply apparatus 200 includes the three terminals 270 through 272. However, the power supply apparatus 200 may include one or three or more power supplies. The number of terminals included in the electronic device 900 and the power supply apparatus 200 may be two or four or more according to the number of power supplies included in the power supply section 280.

Furthermore, in this embodiment the on-off switch control section 990 includes the two diodes 991 and 992. However, the number of diodes included in the on-off switch control section 990 may be one or three or more according to the number of power supplies included in the power supply section 280.

In addition, in this embodiment the breaker circuit 960 includes the two diodes 961 and 962. However, the number of diodes included in the breaker circuit 960 may be one or three or more according to the number of power supplies included in the power supply section 280.

As has been described, when the electronic device 900 is unplugged from the power supply apparatus 200, an electric current which flows to the monitor section 940 is interrupted. This makes the inrush current control section 150 exercise control so as to put the switching element 130 into an OFF state. As a result, charging current to the capacitive element 120 is controlled. Accordingly, when the electronic device 900 is plugged into the power supply apparatus 200, a rapid increase in electric current can be controlled in a circuit in the electronic device 900. That is to say, inrush current which flows at the time of plugging the electronic device 900 after unplugging in a state in which a hot swap can be performed between the electronic device 900 and the power supply apparatus 200 can be controlled.

(Seventh Embodiment)

A seventh embodiment will now be described in detail with reference to the drawing. The differences between the above second embodiment and a seventh embodiment will mainly be described. The same numerals will be used for the same components and description of them will be omitted. In a seventh embodiment a common terminal is used on a plus side of a power supply apparatus and a power supply section includes two power supplies. In addition, a transistor is used for performing switching between connecting and disconnecting the power supplies used for the operation of a comparator and an FET gate control circuit.

Figure 13:
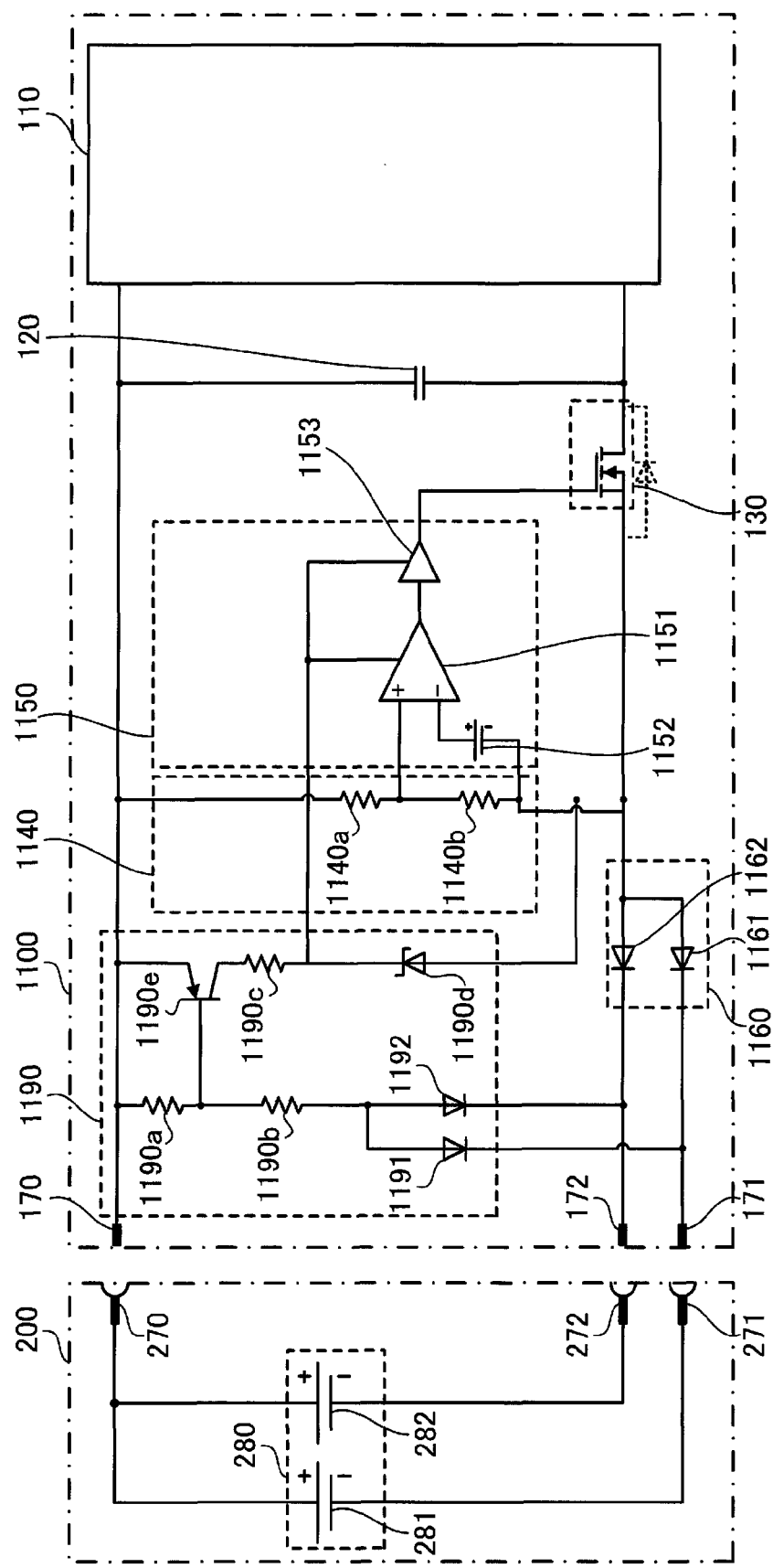
FIG. 13 is a view for describing an electronic device according to a seventh embodiment.

FIG. 13 is a view for describing an electronic device according to a seventh embodiment. As illustrated in FIG. 13, an electronic device 1100 includes a load circuit 110, a capacitive element 120, a switching element 130, a monitor section 1140, an inrush current control section 1150, a breaker circuit 1160, terminals 170, 171, and 172 and an operation control circuit 1190. A hot swap can be performed between the electronic device 1100 and a power supply apparatus 200.

The power supply apparatus 200 includes terminals 270, 271, and 272 and a power supply section 280. This is the same with the second embodiment. The electronic device 1100 and the power supply apparatus 200 can be connected electrically via the terminals 170 through 172 included in the electronic device 1100 and the terminals 270 through 272 included in the power supply apparatus 200.

Furthermore, the monitor section 1140 includes voltage division resistors 1140a and 1140b. The inrush current control section 1150 includes a comparator 1151, a reference power supply 1152, and an FET gate control circuit 1153. The breaker circuit 1160 includes diodes 1161 and 1162. The operation control circuit 1190 includes resistors 1190a, 1190b, and 1190c, a Zener diode 1190d, a transistor 1190e, and diodes 1191 and 1192. The power supply section 280 includes power supplies 281 and 282 which are direct-current power supplies. This is the same with the second embodiment.

The load circuit 110 realizes the function of the electronic device 1100 by the use of power supplied from the power supply apparatus 200. This is the same with the second embodiment.

The capacitive element 120 is an input capacitor which stabilizes power supplied to the load circuit 110. This is the same with the second embodiment.

The switching element 130 controls an electric current which flows in a circuit in the electronic device 1100. This is the same with the second embodiment.

The monitor section 1140 is connected to the terminal 170 on a plus side of voltage supplied to the electronic device 1100. This is the same with the monitor section 140 in the second embodiment. The monitor section 1140 monitors voltage supplied to the electronic device 1100, and outputs voltage, which is a monitoring result, to the inrush current control section 1150. Furthermore, the monitor section 1140 is connected in parallel with the capacitive element 120. The monitor section 1140 monitors voltage inputted from the power supply section 280, that is to say, voltage on a plus side of the power supply section 280 and voltage on a minus side of the power supply section 280 by the voltage division resistors 1140a and 1140b and outputs a monitoring result. The voltage division resistors 1140a and 1140b are set so that when the power supply apparatus 200 supplies normal voltage to the electronic device 1100, the potential difference between both ends of the voltage division resistor 1140b will be greater than or equal to reference voltage supplied from the reference power supply 1152.

The inrush current control section 1150 controls the switching element 130 on the basis of voltage detected by the monitor section 1140. This is the same with the inrush current control section 150 in the second embodiment. The inrush current control section 1150 changes the resistance of the switching element 130 on the basis of voltage monitored by the monitor section 1140. By doing so, the inrush current control section 1150 controls inrush current which flows at the time of performing a hot swap between the electronic device 1100 and the power supply apparatus 200. When voltage monitored by the monitor section 1140 is zero, the inrush current control section 1150 controls the switching element 130 so as to make its resistance infinite. When the electronic device 1100 is unplugged from the power supply apparatus 200, the inrush current control section 1150 sets the resistance of the switching element 130 to a high value. This makes it possible to control inrush current which flows at the time of plugging the electronic device 1100 into the power supply apparatus 200 after the unplugging. In addition, when the electronic device 1100 is plugged into the power supply apparatus 200, the inrush current control section 1150 gradually decreases the resistance of the switching element 130. This makes it possible to control inrush current which flows at the time of plugging the electronic device 1100 into the power supply apparatus 200.

The comparator 1151 compares reference voltage supplied from the reference power supply 1152 with voltage generated between both ends of the voltage division resistor 1140b of the monitor section 1140. This is the same with the comparator 151 in the second embodiment. The comparator 1151 performs operation by the use of power supplied from the power supply section 280 by the functions of the transistor 1190e and the Zener diode 1190d.

The reference power supply 1152 supplies to the comparator 1151 voltage used as reference for comparison. This is the same with the reference power supply 152 in the second embodiment.

The FET gate control circuit 1153 controls the switching element 130, which is an FET, and controls inrush current by gradually decreasing the resistance of the switching element 130. This is the same with the FET gate control circuit 153 in the second embodiment. The FET gate control circuit 1153 performs operation by the use of power supplied from the power supply section 280 by the functions of the transistor 1190e and the Zener diode 1190d.

It is assumed that the electronic device 1100 is unplugged from the power supply apparatus 200 and that input voltage supplied from the power supply apparatus 200 drops. Then discharge current which flows from the capacitive element 120 is interrupted by the breaker circuit 1160, an electric current does not flow to a terminal on a base side of the transistor 1190e, and an electric current between an emitter and a collector of the transistor 1190e is interrupted. As a result, power is not supplied to the comparator 1151 or the FET gate control circuit 1153. In this case, the inrush current control section 1150 outputs an OFF signal. Accordingly, the switching element 130 is controlled so that it will change from an ON state to an OFF state. This prevents charging current from flowing to the capacitive element 120 at the time of the electronic device 1100 being plugged into the power supply apparatus 200 later.

Furthermore, it is assumed that the electronic device 1100 is plugged into the power supply apparatus 200 after unplugging. Then an electric current based on input voltage supplied from the power supply apparatus 200 flows in a circuit in the electronic device 1100. As a result, an electric current flows to the terminal on the base side of the transistor 1190e and an electric current flows between the emitter and the collector of the transistor 1190e. Accordingly, power is supplied to the comparator 1151 and the FET gate control circuit 1153. Furthermore, voltage generated between both ends of the voltage division resistor 1140b, that is to say, monitored voltage increases. The comparator 1151 makes a comparison. When the potential difference between potential on a cathode side of the diode 1161 or 1162 and potential on the plus side of the power supplies of the power supply apparatus 200 is greater than or equal to reference voltage supplied from the reference power supply 1152, the inrush current control section 1150 exercises control so as to gradually decrease the resistance of the switching element 130 in an OFF state and put the switching element 130 into an ON state. This controls an increase in charging current which flows to the capacitive element 120 after the plugging of the electronic device 1100 into the power supply apparatus 200.

The breaker circuit 1160 is placed between the switching element 130 and the operation control circuit 1190. When the electronic device 1100 is unplugged from the power supply apparatus 200, the breaker circuit 1160 prevents, by the diodes 1161 and 1162, electric charges stored by the capacitive element 120 from flowing to the terminal on the base side of the transistor 1190e.

The diodes 1161 and 1162 interrupt discharge current from the capacitive element 120 and prevent it from flowing to the terminal on the base side of the transistor 1190e. Terminals on the cathode side of the diodes 1161 and 1162 are connected to terminals on a cathode side of the diodes 1191 and 1192 respectively.

The terminals 170, 171, and 172 can be connected electrically to the terminals 270, 271, and 272 respectively. Power is supplied from the power supply apparatus 200 to the electronic device 1100 via the terminals 170 through 172 and 270 through 272.

The operation control circuit 1190 performs switching between connecting and disconnecting the power supplies used for the operation of the comparator 1151 and the FET gate control circuit 1153. When the electronic device 1100 is unplugged from the power supply apparatus 200, the operation control circuit 1190 interrupts power supplied to the comparator 1151 and the FET gate control circuit 1153 included in the inrush current control section 1150.

The transistor 1190e is a pnp transistor which performs switching between connecting and disconnecting the power supplies used for the operation of the comparator 1151 and the FET gate control circuit 1153. When the electronic device 1100 is unplugged from the power supply apparatus 200, the transistor 1190e turns off the power supplies used for the operation of the comparator 1151 and the FET gate control circuit 1153. In addition, when the electronic device 1100 is plugged into the power supply apparatus 200, the transistor 1190e turns on the power supplies used for the operation of the comparator 1151 and the FET gate control circuit 1153. A terminal on the collector side of the transistor 1190e is connected to the comparator 1151 and the FET gate control circuit 1153 via the resistor 1190c. A terminal on the emitter side of the transistor 1190e is connected to the terminal on the plus side of the power supply apparatus 200. The terminal on the base side of the transistor 1190e is connected to a portion where the resistors 1190a and 1190b are connected.

The resistors 1190a and 1190b are voltage division resistors for controlling voltage at the terminal on the base side of the transistor 1190e. One terminal of each of the resistors 1190a and 1190b is connected to the terminal on the base side of the transistor 1190e. The other terminal of the resistor 1190a is connected to the terminal on the plus side of the power supply apparatus 200. The other terminal of the resistor 1190b is connected to terminals on an anode side of the diodes 1191 and 1192.

The Zener diode 1190d supplies constant voltage to the comparator 1151 and the FET gate control circuit 1153. A terminal on an anode side of the Zener diode 1190d is connected to the terminals on a minus side of the power supplies. A terminal on a cathode side of the Zener diode 1190d is connected to the terminal on the collector side of the transistor 1190e via the resistor 1190c and is connected to the comparator 1151 and the FET gate control circuit 1153.

Furthermore, the operation control circuit 1190 interrupts return current between the two power supplies 281 and 282 included in the power supply section 280.

Terminals on a cathode side of the diodes 1191 and 1192 are connected to terminals on the cathode side of the diodes 1161 and 1162 respectively. The diodes 1191 and 1192 interrupt return current between the two power supplies 281 and 282 included in the power supply section 280.

The power supply section 280 includes the power supplies 281 and 282 which supply direct-current power used by the electronic device 1100. The power supply section 280 supplies power to the electronic device 1100 by the use of the power supplies 281 and 282 connected in parallel. As a result, the reliability of the power supply section 280 is increased.

As stated above, when the electronic device 1100 is unplugged from the power supply apparatus 200, discharge current from the capacitive element 120 is interrupted by the diodes 1161 and 1162 and an electric current does not flow to the terminal on the base side of the transistor 1190e. As a result, the transistor 1190e shuts off the supply of power used for the operation of the comparator 1151 and the FET gate control circuit 1153. The operation of the comparator 1151 and the FET gate control circuit 1153 stops and an OFF signal is outputted. Accordingly, control is exercised so as to change the switching element 130 from an ON state to an OFF state.

When the electronic device 1100 is plugged into the power supply apparatus 200 after the unplugging, an electric current supplied from the power supply section 280 flows to the terminal on the base side of the transistor 1190e and the transistor 1190e goes into an ON state. As a result, an electric current flows between the terminal on the emitter side and the terminal on the collector side of the transistor 1190e. Accordingly, power used for the operation of the comparator 1151 and the FET gate control circuit 1153 can be supplied from the power supply section 280 and the comparator 1151 and the FET gate control circuit 1153 begin to operate. In addition, an electric current supplied from the power supply section 280 flows through the monitor section 1140 and voltage generated between both ends of the voltage division resistor 1140b, that is to say, monitored voltage becomes higher than or equal to reference voltage. The comparator 151 detects that the monitored voltage is higher than or equal to the reference voltage supplied from the reference power supply 1152. As a result, the inrush current control section 1150 exercises control so as to gradually decrease the resistance of the switching element 130 in an OFF state and put the switching element 130 into an ON state. By doing so, charging current to the capacitive element 120 is controlled and an electric current flows in the electronic device 1100.

In this embodiment, the power supply section 280 includes the two power supplies 281 and 282, the electronic device 1100 includes the three terminals 170 through 172, and the power supply apparatus 200 includes the three terminals 270 through 272. However, the power supply apparatus 200 may include one or three or more power supplies. The number of terminals included in the electronic device 1100 and the power supply apparatus 200 may be two or four or more according to the number of power supplies included in the power supply section 280.

Furthermore, in this embodiment the operation control circuit 1190 includes the two diodes 1191 and 1192. However, the number of diodes included in the operation control circuit 1190 may be one or three or more according to the number of power supplies included in the power supply section 280.

In addition, in this embodiment the breaker circuit 1160 includes the two diodes 1161 and 1162. However, the number of diodes included in the breaker circuit 1160 may be one or three or more according to the number of power supplies included in the power supply section 280.

Figure 14:
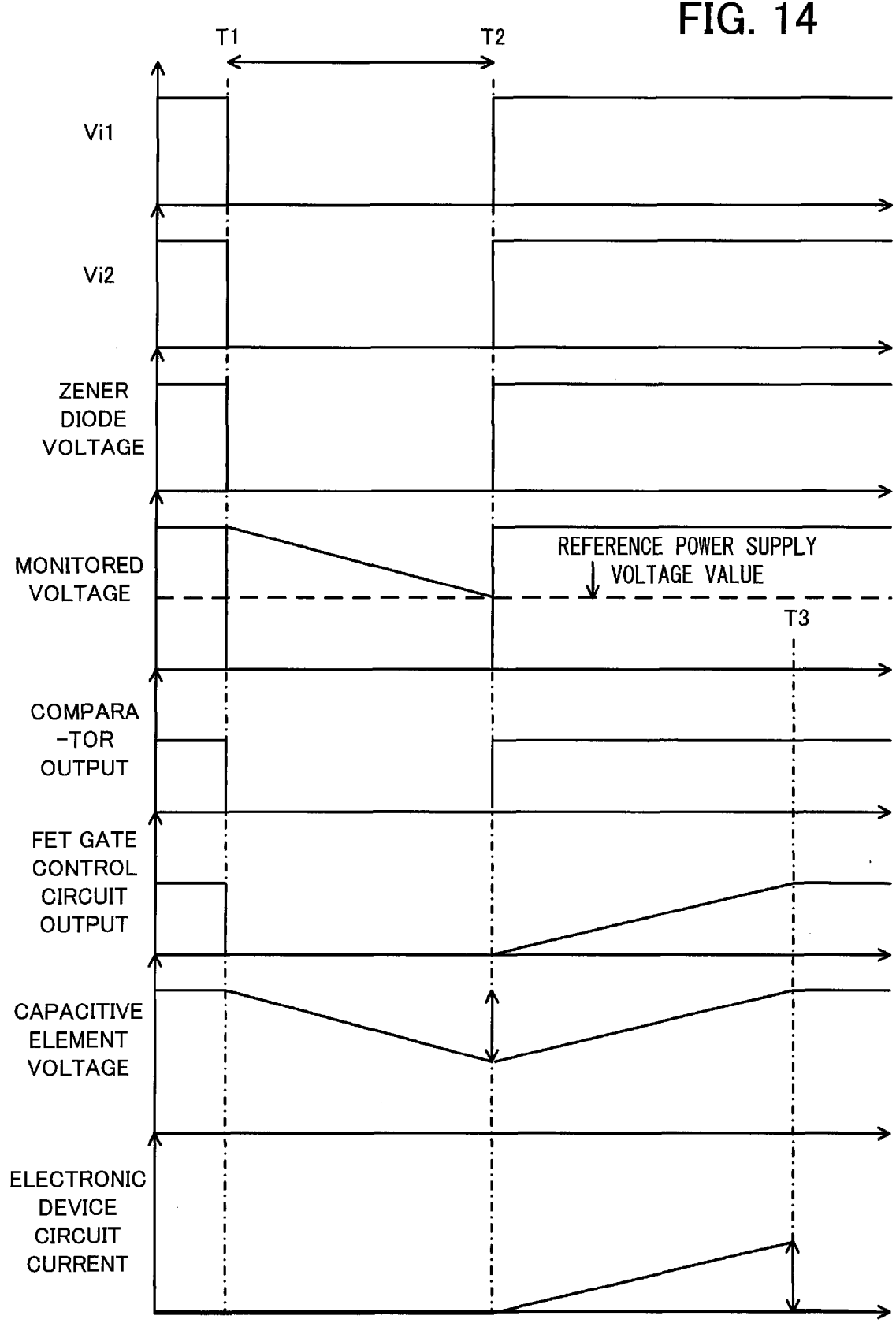
FIG. 14 indicates the waveforms of operation at the time of unplugging and plugging the electronic device according to the seventh embodiment.

FIG. 14 indicates the waveforms of operation at the time of unplugging and plugging the electronic device according to the seventh embodiment.

In FIG. 14, Vi1 and Vi2 indicate the waveforms of voltage of the two power supplies at the receiving end of the electronic device 1100. Vi1 indicates the waveform of voltage between the terminals 170 and 171. Vi2 indicates the waveform of voltage between the terminals 170 and 172. Zener Diode Voltage indicates voltage supplied to the comparator 1151 and the FET gate control circuit 1153. Monitored Voltage indicates voltage generated between both ends of the voltage division resistor 1140b. Reference Power Supply Voltage Value indicates a voltage value of the reference power supply 1152. Comparator Output indicates output from the comparator 1151. FET Gate Control Circuit Output indicates output from the FET gate control circuit 1153. Capacitive Element Voltage indicates voltage generated between both ends of the capacitive element 120. Electronic Device Circuit Current indicates an electric current which flows in a circuit in the electronic device 1100.

A circuit state in the electronic device 1100 at the time of unplugging and plugging the electronic device 1100 will be described with reference to FIG. 14. When the electronic device 1100 is unplugged from the power supply apparatus 200 (time T1), Vi1 or Vi2, which is voltage at the receiving end of the electronic device 1100, drops. As a result, the capacitive element voltage gradually drops with a discharge of the capacitive element 120. However, the terminal on the base side of the transistor 1190e is also connected to the capacitive element 120 via the diodes 1161 and 1162, so discharge current from the capacitive element 120 is interrupted. Accordingly, it is possible to detect Vi1 and Vi2 without being influenced by voltage generated between both ends of the capacitive element 120. As a result, when an electric current which flows to the terminal on the base side of the transistor 1190e becomes 0 A, power is not supplied to the comparator 1151 and the FET gate control circuit 1153. As a result, the inrush current control section 1150 goes into an OFF state regardless of a value of the monitored voltage. When the inrush current control section 1150 goes into an OFF state, the FET gate control circuit output becomes 0. Accordingly, control is exercised so as to put an FET gate 131 of the switching element 130 into an OFF state.

When the electronic device 1100 is plugged into the power supply apparatus 200 after the unplugging (time T2), an electric current flows to the terminal on the base side of the transistor 1190e. As a result, as indicated by the Zener diode voltage, power is supplied to the comparator 1151 and the FET gate control circuit 1153. When the comparator 1151 which resumes operation detects that the monitored voltage has become higher than or equal to the reference power supply voltage value, the comparator output is inverted and the FET gate control circuit 1153 to which the supply of power is resumed operates. The FET gate control circuit 1153 gradually increases the FET gate control circuit output. As a result, gate voltage of the FET gate 131 of the switching element 130 increases and ON-state resistance between a drain and a source of the FET gate 131 gradually decreases. Accordingly, the capacitive element 120 is gradually charged. This prevents excessive inrush current from flowing in a circuit in the electronic device 1100.

After that, when the FET gate 131 completely goes into an ON state and the resistance value of the FET gate 131 is minimized (time T3), charging the capacitive element 120 is completed according to voltage supplied at this time to the capacitive element 120 and voltage generated between both ends of the capacitive element 120 reaches a determined value. As a result, charging current to the capacitive element 120 becomes 0 A and an electric current which flows in the electronic device 1100 stabilizes.

As has been described, when the electronic device 1100 is unplugged from the power supply apparatus 200, the operation control circuit 1190 shuts off the supply of power to the comparator 1151 and the FET gate control circuit 1153. By doing so, control is exercised so as to put the switching element 130 into an OFF state. As a result, charging current to the capacitive element 120 is controlled. Accordingly, when the electronic device 1100 is plugged into the power supply apparatus 200, a rapid increase in electric current can be controlled in a circuit in the electronic device 1100. That is to say, inrush current which flows at the time of plugging the electronic device 1100 after unplugging in a state in which a hot swap can be performed between the electronic device 1100 and the power supply apparatus 200 can be controlled.

According to the disclosed electronic device, inrush current can be controlled.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic device plugged into or unplugged from a first power supply apparatus, the electronic device comprising:
    a load circuit which operates by power supplied from the first power supply apparatus;
    a capacitive element connected in parallel with the load circuit;
    a switching element connected between the first power supply apparatus and the load circuit in series with the first power supply apparatus and the load circuit;
    a monitor section which monitors voltage of the capacitive element and which is connected in parallel with the capacitive element;
    an inrush current control section which changes resistance of the switching element on the basis of the voltage monitored by the monitor section in order to control inrush current that flows at the time of the electronic device being plugged into or unplugged from the first power supply apparatus; and
    a breaker circuit which is a first rectifying element placed between the switching element and the monitor section and which prevents electric charges stored by the capacitive element from flowing into the monitor section at the time of the electronic device being unplugged from the first power supply apparatus.

2. The electronic device according to claim 1, wherein:
    the electronic device is plugged into or unplugged from a second power supply apparatus; and
    the breaker circuit further includes a second rectifying element connected in series with the monitor section.

3. The electronic device according to claim 1, wherein when the voltage monitored by the monitor section is zero, the inrush current control section exercises control so as to make the resistance of the switching element infinite.

4. The electronic device according to claim 1 further comprising:
    an on-off switch which controls an electric current that flows through the monitor section; and
    an on-off switch control section which turns off the on-off switch at the time of the electronic device being unplugged from the first power supply apparatus.

5. An electronic device plugged into or unplugged from a power supply apparatus, the electronic device comprising:
    a load circuit which operates by power supplied from the power supply apparatus;
    a capacitive element connected in parallel with the load circuit;
    a switching element connected between the power supply apparatus and the load circuit in series with the power supply apparatus and the load circuit;
    an inrush current control section which changes resistance of the switching element on the basis of voltage of the capacitive element in order to control inrush current that flows at the time of the electronic device being plugged into or unplugged from the power supply apparatus;
    an operation control circuit which shuts off supply of power to the inrush current control section at the time of the electronic device being unplugged from the power supply apparatus; and
    a breaker circuit which is a rectifying element placed between the switching element and the operation control circuit and which prevents electric charges stored by the capacitive element from flowing into the operation control circuit at the time of the electronic device being unplugged from the power supply apparatus.

* * * * *